(12) United States Patent
Goldwitz

(10) Patent No.: US 7,862,479 B2
(45) Date of Patent: Jan. 4, 2011

(54) FOLDABLE TRAMPOLINE AND CONVERSION KIT

(76) Inventor: Brian Goldwitz, 13 Wood St., West Haven, CT (US) 06516

( * ) Notice: Subject to any disclaimer, the term of this patent is extended or adjusted under 35 U.S.C. 154(b) by 0 days.

(21) Appl. No.: 12/510,218

(22) Filed: Jul. 27, 2009

(65) Prior Publication Data
US 2010/0022355 A1    Jan. 28, 2010

Related U.S. Application Data

(60) Provisional application No. 61/083,897, filed on Jul. 25, 2008.

(51) Int. Cl.
*A63B 5/18* (2006.01)
*A63B 5/11* (2006.01)
(52) U.S. Cl. .............. 482/27; 482/28; 403/174
(58) Field of Classification Search .......... 482/27, 482/28; 403/174, 326; 5/666, 111
See application file for complete search history.

(56) References Cited

U.S. PATENT DOCUMENTS 6,110,074 A * 8/2000 Tacquet ................ 482/27
6,648,799 B2 * 11/2003 Hall ..................... 482/28
2010/0075810 A1 * 3/2010 Schaffer ................ 482/27

* cited by examiner

*Primary Examiner*—Jerome Donnelly
(74) *Attorney, Agent, or Firm*—Julio M. Loza; Loza & Loza, LLP

(57) ABSTRACT

Embodiments of the invention are directed to trampolines and component parts including a frame assembly to fold a fixed or foldable trampoline from an expanded state to a collapsed state or vice-versa. In one embodiment, a frame assembly includes a base frame member, two peripheral frame members and two connecting members connecting the two peripheral frame members to the base frame member. The two peripheral frame members are also connected to a center joint which may slide up and down a center frame post via a folding mechanism which may include a crank shaft and an elongated threaded member. In some embodiments, the frame assembly may include hydraulics and the two peripheral frame members may be off-set relative to one another. Embodiments of component parts for the trampoline may also include a plurality of net frame members, a foldable ladder, a wheeled support and a frame pad.

20 Claims, 32 Drawing Sheets

1800
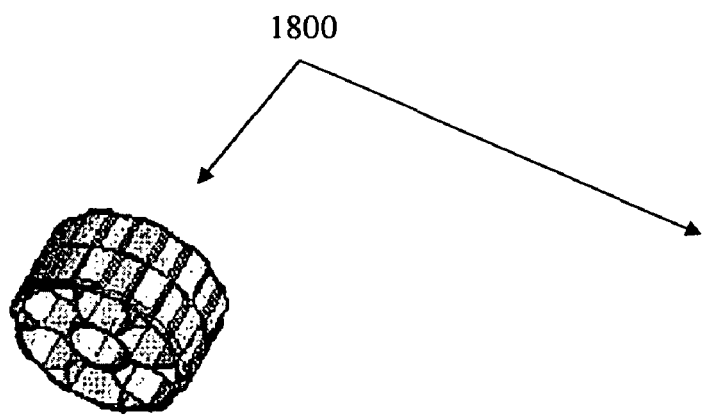 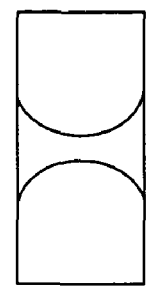
FIG. 20A            FIG. 20B
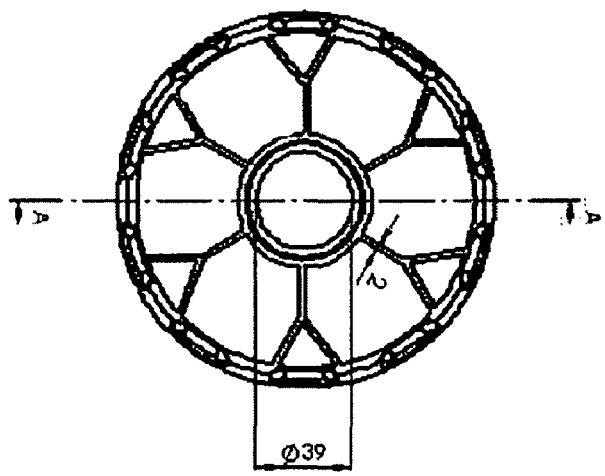 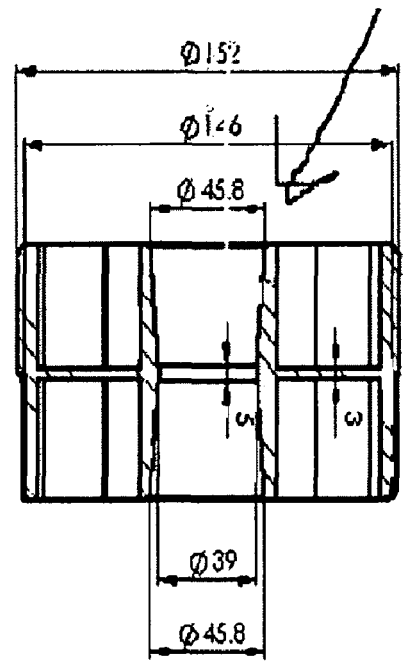
FIG. 20C            FIG. 20D

FOLDABLE TRAMPOLINE AND CONVERSION KIT

CLAIM OF PRIORITY

This application claims the benefit of U.S. Provisional Application No. 61/083,897 entitled "Features for Trampolines" filed Jul. 25, 2008, and hereby incorporated by reference.

FIELD OF INVENTION

At least some features relate to folding trampolines and a conversion kit to facilitate folding of such trampolines.

BACKGROUND OF INVENTION

Trampolines are used for a variety of athletic and recreational purposes. However, injuries have sometimes resulted when a person jumping on a trampoline lands near the boundary of the trampoline surface thereby striking the trampoline frame and/or falling from the trampoline to the ground. Other injuries have resulted from assembling and dissembling the trampoline and its component parts, such as pinched fingers and/or limbs when folding and/or unfolding the trampoline and/or its component parts. An article in the Mar. 3, 1998, New York Times reports that trampoline-related emergency room hospitalizations of children doubled between 1990 and 1995 (to nearly 60,000), and that the rate of injuries shows no sign of abating. Some in the medical community have called for a ban on the sale of home trampolines. While stopping short of a ban, the U.S. Consumer Products Safety Commission has called for safety improvements to home trampolines.

One approach to reducing such injuries has been to form a wall around the perimeter of a trampoline surface so that when a jumper lands close to the edge, the wall prevents the jumper from falling off. Examples are shown in U.S. Pat. Nos. 3,501,132, 5,399,132 and 6,261,207. However, these devices suffer from various drawbacks and, in some cases, introduce additional safety concerns.

Moreover, although foldable trampolines are known in the prior art, prior art foldable trampolines generally do not include safety features for protecting a user when assembling and dissembling the trampoline and its component parts resulting in the injuries as discussed previously. For example, during the process of folding a trampoline in tension, prior art foldable trampolines may cause the trampoline to unavoidably snap into a folded condition thereby causing bodily harm to one attempting to fold the trampoline.

Moreover, although trampolines generally include a frame pad about the periphery of the trampoline, prior art frame pads tend to concave inward relative to the outer and inner portions of the frame, i.e., form a "gutter". Such frame pads generally are intended cover the springs and trampoline frame and help to protect the user from falling between the springs or impacting the frame. Over time and when subjected to the elements, the median portion of the frame may become compromised. When this occurs, water and debris may become trapped within this median portion, i.e., "gutter," thereby compromising the integrity of the frame and/or shortening its lifetime. A compromised frame pad may lead to injuries as described previously.

Moreover, trampolines are generally supported by U-shaped supporting devices which pivotably move from a collapsed position to an expanded position. When in the expanded position, the trampoline is difficult to re-position due to the heavy weight of the trampoline net alone. Repositioning of prior art trampolines may lead to injuries as described previously.

Moreover, prior art trampolines generally employ detachable ladders to accommodate mounting and de-mounting onto and off of the trampoline, respectively. Because the detachable ladder is a separate component relative to the trampoline itself, it risks becoming separated from the trampoline which invariably defeats its purpose. For example, if a trampoline must be moved from one location to another location and a user forgets to bring the detachable ladder, then its purpose of facilitating safe mounting and de-mounting is thereby defeated.

SUMMARY OF INVENTION

One embodiment provides a trampoline, comprising at least one frame assembly, at least two arcuate frame members connected to first and second peripheral frame members of the at least one frame assembly and defining a circle in an expanded state, and a resilient web attached to the frame assembly by a plurality of springs. The frame assembly may comprise (a) a base frame member, (b) a first connecting member pivotably connected approximately at a first end of the base frame member and a second connecting member pivotably connected approximately at a second end of the base frame member, (c) a center post positioned between the first connecting member and the second connecting member and coupled to the base frame member at a first end, (d) a center bracket slidably engaged to the center post, (e) a first peripheral frame member pivotably connected to the first connecting member and a second peripheral frame member pivotably connected to the second connecting member wherein both first and second connecting frame members are connected to the center bracket, (f) a supporting bracket coupled to a second end of the center post, the supporting bracket having a horizontally-oriented protrusion projecting inwardly relative to the trampoline and an opening, (g) a crank shaft rotationally coupled to the second end of the center post, the crank shaft having a first gear portion, and/or (h) an elongated threaded member passing through the opening of the support bracket and rotatably coupled to the center bracket while extending along the center post, the elongated threaded member having a second gear portion in rotational connection with the first gear portion, wherein upon rotational force being applied to the elongated member via the crank shaft, the elongated threaded member rotates to cause the first and second peripheral frame members to collapse into one another or expand away from one another. The center bracket includes a retaining block fixedly attached thereto, the retaining block having a threaded aperture through which the elongated threaded member passes. The first and second gear portions may be situated approximately ninety degrees relative to one another. The length of the elongated threaded member is substantially the same as a length of the center post. Upon rotational force being applied to the elongated member in a first direction, the first and second peripheral members are collapsed into one another and the center bracket is substantially adjacent to the base frame member.

The trampoline may further include a set of wheels attached to the base frame member. The trampoline may also include at least two hydraulic pistons connected to the base frame member and pivotably connected to the center bracket. The first peripheral frame member may be off-set relative to the second peripheral frame member.

The trampoline may also include (a) a plurality of frame members pivotably connected about a periphery of the trampoline frame assembly, the frame members adapted to position between an expanded state and a collapsed state, and (b) a plurality of pivot joints connecting the plurality of frame members to an inner circumference of the trampoline frame assembly wherein the pivot joints comprise a first member and a second member pivotably connected by a retaining pin, the first member and the second member defining an aperture at the point of connection thereto. In the expanded state the plurality of frame members is in a vertical position relative to a horizontal surface. In the collapsed state the plurality of frame members is in a horizontal position relative to a horizontal surface. The plurality of frame members may be adapted to collapse inward toward a middle of the trampoline frame assembly.

In one example, the trampoline may also include (a) a U-shaped support pivotably connected to a periphery of a trampoline and adapted to position from a collapsed state to an extended state, the support including a substantially horizontal bar and at least two vertical bars attached thereto, the substantially horizontal bar including a medial portion and at least two end portion on opposite ends of the medial portion, each end portion having a W-shaped configuration; and (b) at least two wheels on the support and adapted to position from a first position to a second position wherein the first position is on the medial portion and the second position is on a crest of the W-shaped configuration.

In another example, the trampoline may include a safety frame pad around its perimeter. The frame pad may comprise (i) a top layer including a flexible, weather-resistant material; (ii) a bottom layer comprising a foam material; and (iii) a middle layer comprising a foam material situated between the top layer and the bottom layer wherein the top layer and the bottom layer have a substantially similar width and the middle layer has a width substantially smaller relative to the top and bottom layers thereby defining a convex profile.

In another example, the trampoline may also include a foldable trampoline ladder. The foldable trampoline ladder may comprise: (i) a horizontally-positioned bar; (ii) at least two vertical bars fixedly attached to the horizontally-positioned bar, the at least two vertical bars each having a proximal end and a distal end, the at least two vertical bars attached to the horizontally-positioned bar at each proximal end; (iii) at least two cylindrical-like fixtures coupled to each distal end of the at least two vertical bars wherein the cylindrical-like fixtures are adapted to receive a trampoline frame; and (iv) a plurality of rungs situated between the at least two vertical bars, wherein the at least two cylindrical-like fixtures permit the trampoline ladder to rotate when the trampoline is folded or unfolded.

BRIEF DESCRIPTION OF DRAWINGS

FIG. 20A is a perspective view of a wheel for the wheeled support of FIGS. 18A and 18B according to an embodiment of the invention.

FIG. 20B is a cross-sectional view of the wheel of FIG. 20A.

FIG. 20C is front view of the wheel of FIG. 20A.

FIG. 20D is a cross-sectional view of the wheel of FIG. 20C.

DETAILED DESCRIPTION

The following detailed description is of the best currently contemplated modes of carrying out the present invention. The description is not to be taken in a limiting sense, but is made merely for the purpose of illustrating the general principles of the invention.

Embodiments of the invention are directed to folding trampolines and component parts including a frame assembly to fold a fixed or foldable trampoline from an expanded state to a collapsed state or vice-versa. In one embodiment, a frame assembly includes a base frame member, two peripheral frame members and two connecting members connecting the two peripheral frame members to the base frame member. The two peripheral frame members are also connected to a center joint which may slide up and down a center frame post via a folding mechanism which may include a crank shaft and an elongated threaded member. In some embodiments, the frame assembly may include hydraulics and the two peripheral frame members may be off-set relative to one another. Embodiments of component parts for the trampoline may also include a plurality of net frame members, a foldable ladder, a wheeled support and a frame pad.

Figure 1:
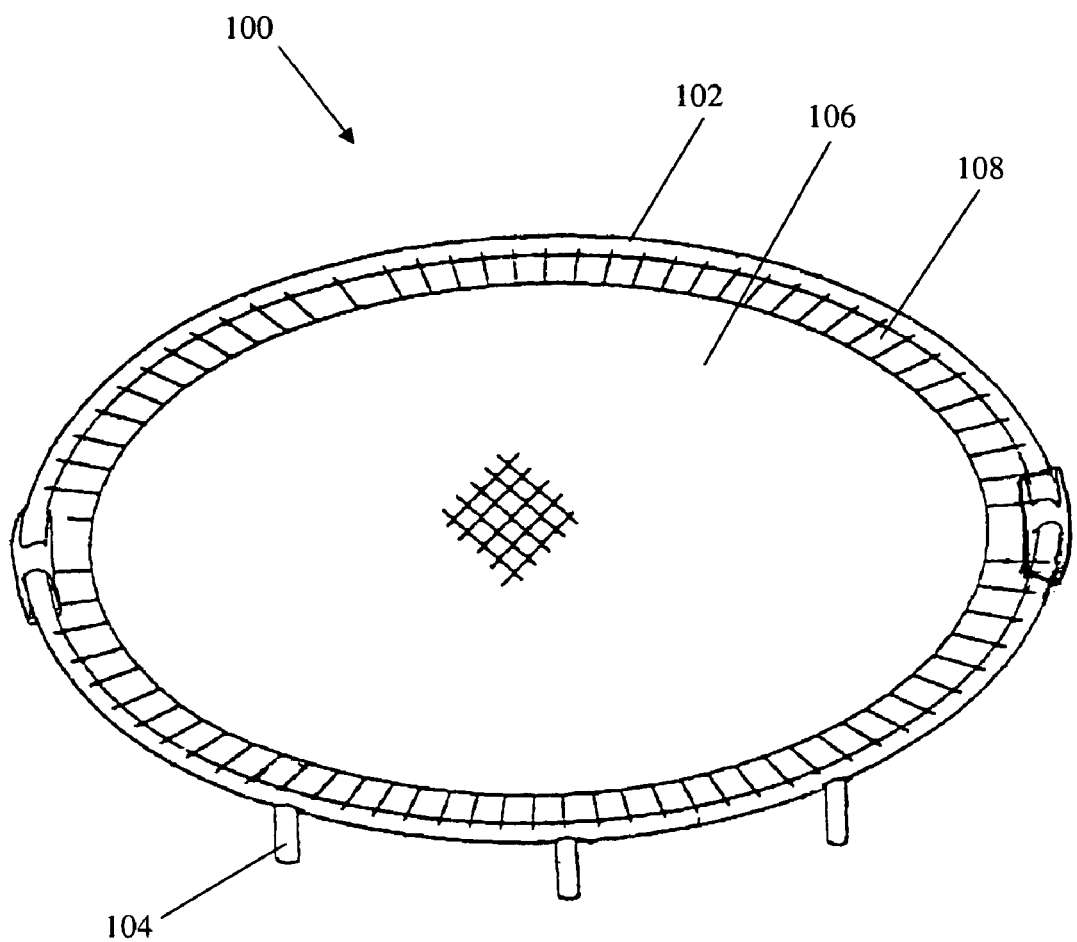
FIG. 1 illustrates a perspective view of a trampoline in an expanded state.

FIG. 1 illustrates a perspective view of a trampoline in an expanded state. Trampoline 100 generally includes a trampoline frame member 102 supported by a plurality of supporting members 104 to elevate the frame member from a horizontal surface. The trampoline frame member 102 supports a resilient web 106 by a plurality of springs 108. Such web 106 may be used as a jumping surface.

Figure 2:
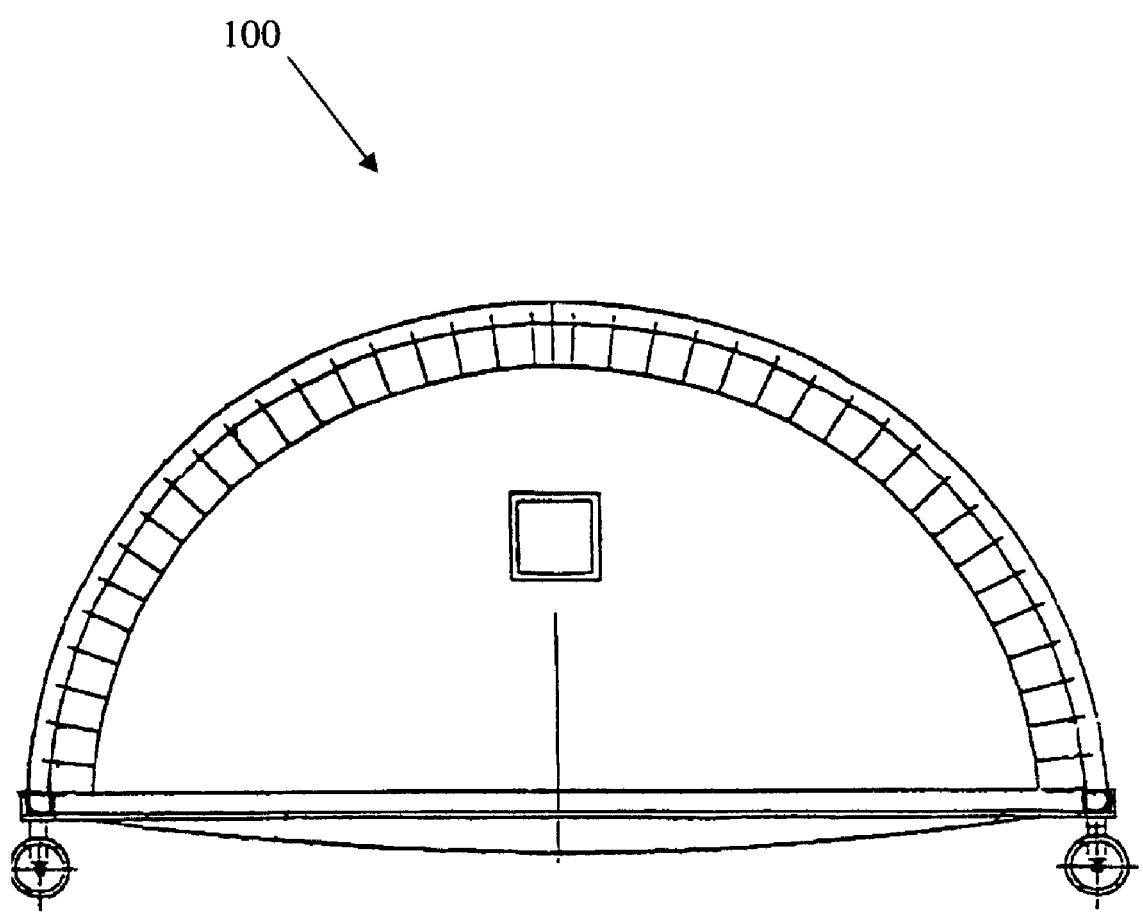
FIG. 2 illustrates a perspective view of the trampoline of FIG. 1 in a collapsed state.

FIG. 2 illustrates a perspective view of the trampoline of FIG. 1 in a collapsed state. That is, to make it easier to store and/or transport, the trampoline 100 may be folded so that a first half of the trampoline surface and a second half of the trampoline surface fold together in a substantially perpendicular position.

Trampoline Folding Mechanism

Figure 3:
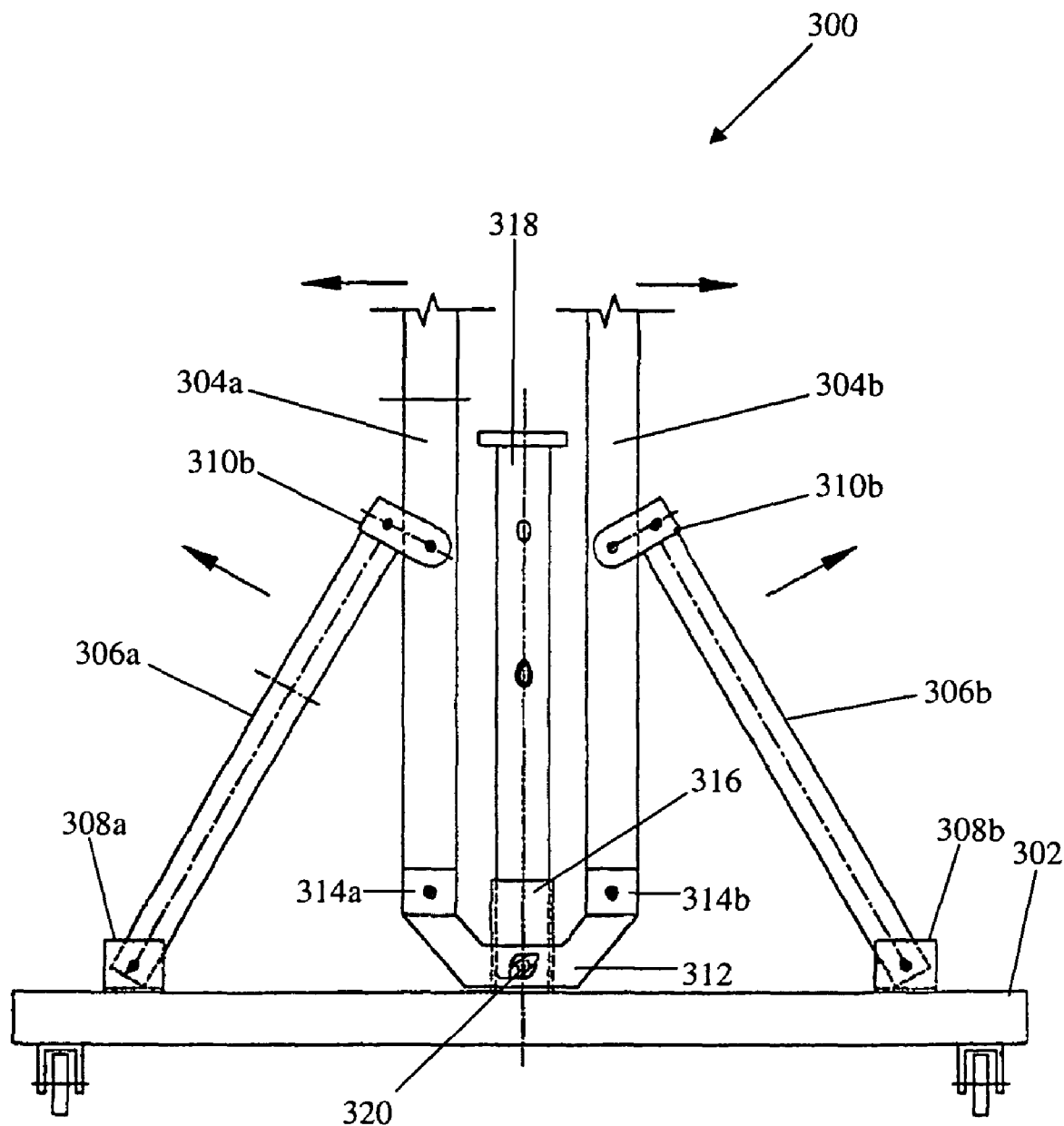
FIG. 3 illustrates a frame assembly of a foldable trampoline in a collapsed state.

FIG. 3 illustrates a frame assembly 300 of a foldable trampoline in a collapsed state. The frame assembly 300 includes a base frame member 302, a first peripheral frame member 304a, a second peripheral frame member 304b, and first and second connecting frame members 306a and 306b. A first end of the first connecting frame member 306a is pivotally connected to the base frame member 302 at a first pivot joint 308a, and a second end of the first connecting frame member 306a is pivotally connected to the first peripheral frame member 304a at a second pivot joint 310a. Similarly, a first end of the second connecting frame member 306b is pivotally connected to the base frame member 302 at a third pivot joint 308b, and a second end of the second connecting frame member 306b is pivotally connected to the second peripheral frame member 304b at a fourth pivot joint 310b.

The frame assembly 300 of FIG. 3 further includes a center bracket 312 pivotally connected to the first and second peripheral frame members 304a and 304b respectively at the pivot joints 314a and 314b. One end each of the first and second peripheral frame members 304a and 304b, and both ends of the center bracket 312, include corresponding apertures for respectively receiving any one of numerous known fastening means, such as for example, a cotter pin, or a nut and bolt assembly, to thereby pivotally connect the first and second peripheral frame members 304a and 304b respectively to the center bracket 312. The center bracket 312 may further include a sleeve 316 for slidably receiving a center frame post 318, where the center post 318 is coupled to the base frame member 302. The center bracket 312 may be located at any position along the center frame post 318, and may be releasably secured thereto by a locking assembly 320.

Figure 4:
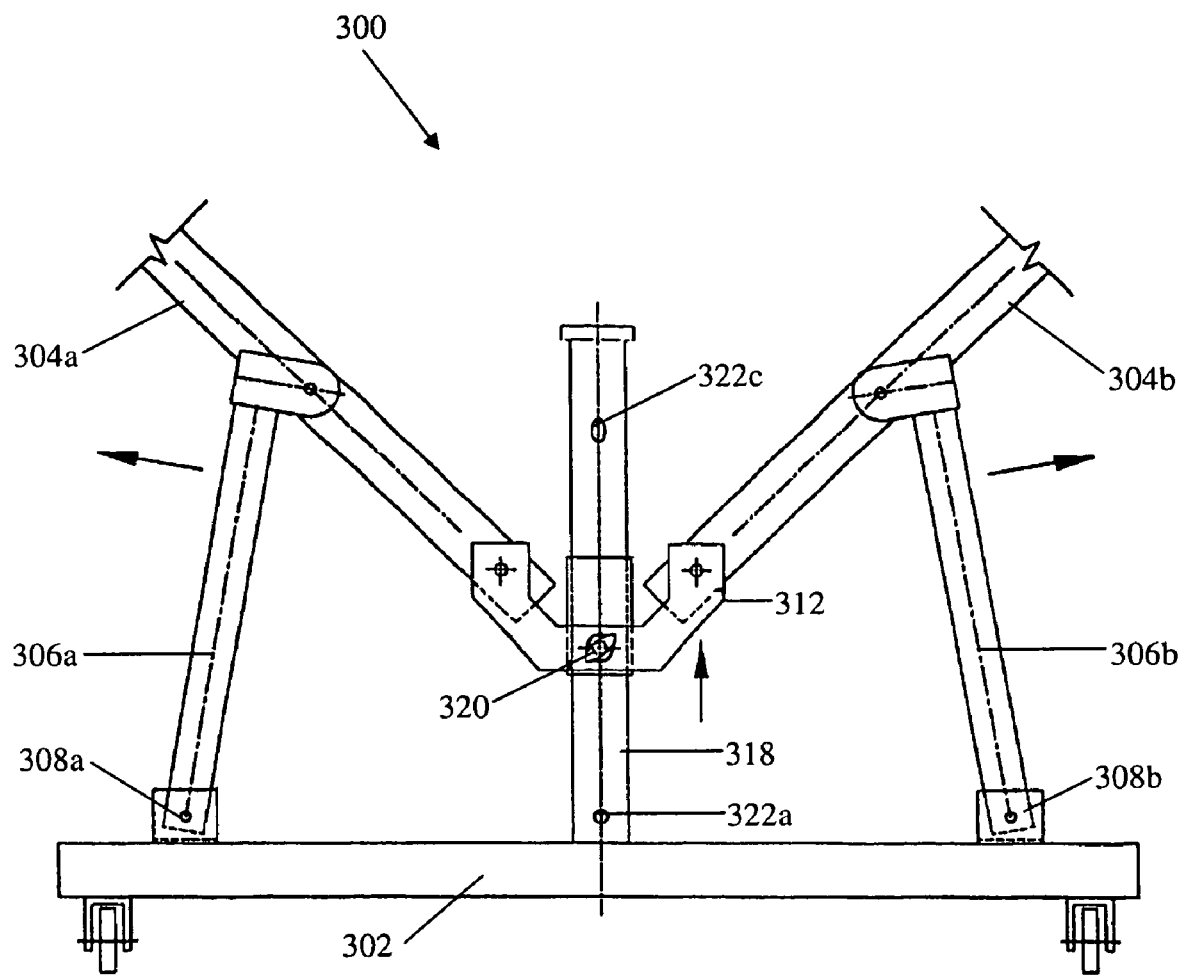
FIG. 4 illustrates the frame assembly of FIG. 3 is a partially folded state.
Figure 5:
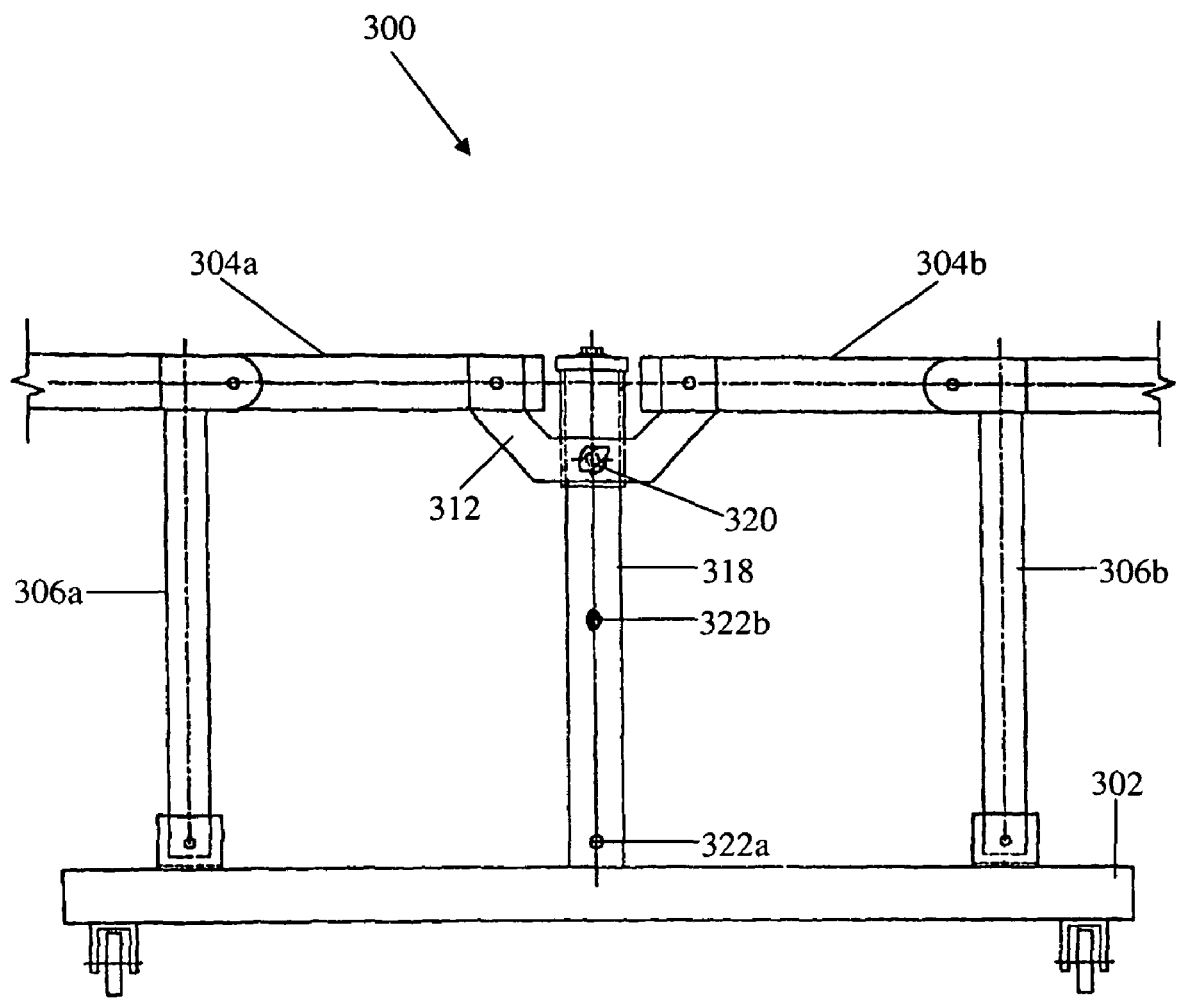
FIG. 5 illustrates the frame assembly of FIG. 3 in an expanded state.

FIGS. 4 and 5 illustrate various states of expansion of the frame assembly 300 FIG. 3. As shown in FIGS. 4 and 5, the center bracket 312 can be raised and lowered about the center frame post 318. In one embodiment, by releasing the locking mechanism 320 from an aperture 322a at a lower end of the center frame post 318, the center bracket 312 can be raised to such a position whereby the locking mechanism 320 can engage an aperture 322c at an upper end of center frame post 318. As shown in FIG. 4, the various frame members of the frame assembly 300 move relative to each other about each respective pivot joint described above. Accordingly, the center bracket 312 can be located on center frame post 318 and slides along the length of the center frame post 318. In one embodiment, a locking mechanism 320 may engage apertures 322a, 322b or 322c along the center frame post 318 to support the first and second peripheral frame members 304a and 304b.

FIG. 5 illustrates the frame assembly 300 of FIG. 3 in a fully expanded state. As shown in FIG. 5, the center bracket 312 can be raised to an upper end of the center frame post 318 so that the first and second peripheral frame members 304a and 304b are in substantially a horizontal position, thereby extending or opening the trampoline. In one embodiment, the locking mechanism 320 can engage the aperture 322c at an upper end of center frame post 318 to lock the frame assembly 300 in place. Accordingly, the frame assembly 300 is placed and locked in an unfolded condition, or expanded state, to place a resilient trampoline jump surface or web in a conventional trampoline position.

In many cases, the configuration of a folding trampoline requires at least two individuals to fold and unfold the trampoline in view of its heavy weight and size. Moreover, additional tools, such as the lateral frame member, may be required to fully fold and/or unfold the trampoline. However, the frame assembly 300 (illustrated in FIGS. 3-5) may be adapted or configured to allow a single operator to safely fold and unfold a trampoline. FIGS. 6-10 illustrate a frame assembly with an integrated lifting and retraction mechanism that allows a single operator to unfold and fold a trampoline.

Figure 6:
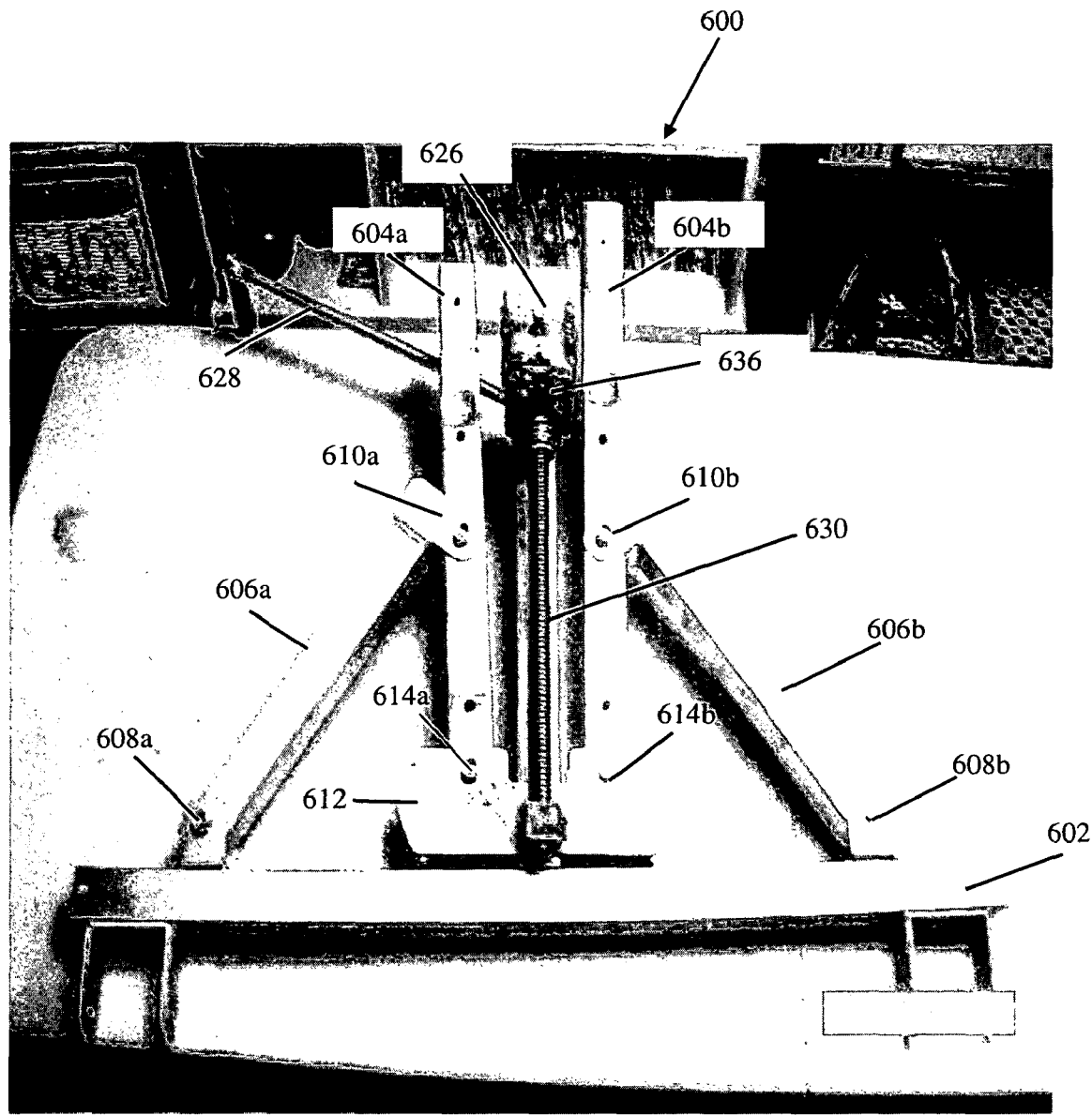
FIG. 6 illustrates a frame assembly of a foldable trampoline in a collapsed state according to an embodiment of the invention.

FIG. 6 illustrates a frame assembly 600 of a foldable trampoline in a collapsed state according to an embodiment of the invention. The frame assembly 600 includes a base frame member 602, a first peripheral frame member 604a, a second peripheral frame member 604b, and connecting frame members 606a and 606b. A first end of the connecting frame member 606a is pivotally connected to the base frame member 602 at a first pivot joint 608a, and a second end of the connecting frame member 606a is pivotally connected to the first peripheral frame member 604a at a second pivot joint 610a. Similarly, a first end of the connecting frame member 606b is pivotally connected to the base frame member 602 at a third pivot joint 608b, and a second end of the connecting frame member 606b is pivotally connected to the second peripheral frame member 604b at a fourth pivot joint 610b.

The frame assembly 600 of FIG. 6 further includes a center bracket 612 pivotally connected to the first and second peripheral frame members 604a and 604b respectively at fifth and sixth pivot joints 614a and 614b. Each end of the first and second peripheral frame members 604a and 604b, each end of the base frame member 602, and both ends of the center bracket 612, include corresponding apertures or coupling points for receiving any one of numerous known fastening means, such as for example, a cotter pin, or a nut and bolt assembly, to thereby pivotally connect the first and second peripheral frame members 604a and 604b respectively to the center bracket 612 and the base frame member 602. The center bracket 612 may include or define an aperture or sleeve (not shown) for slidably engaging with a center frame post 618. The center bracket 612 may be adapted to move along (i.e., up and down) the center frame post 618.

A gear housing bracket 626 serves to house portions of a folding mechanism (to fold and unfold a trampoline, i.e., from a collapse state to an expanded state, and vice-versa). A support bracket 636 may serve to support a threaded member 630. The gear housing 626 and support bracket 636 may be fixedly attached to a top end of the center frame post 618. In one embodiment, the gear housing 626 may be polygonal in shape, i.e., rectangular or square; however, other suitable geometric configurations are within the scope of the invention. The gear housing 626 may include an opening through which a crack shaft passes to the interior of the gear housing 626. The support bracket 636 may also define an opening through which the head of the threaded member 630 passes. According to some embodiments, the folding mechanism may include the component parts of at least the crank shaft 628 and the elongated threaded member 630. The crank shaft 628 may include a first portion (i.e., handle portion) and a second portion (i.e., a torque portion) situated approximately ninety (90) degrees relative to one another. Note that since the elongated threaded member 630 is positioned within the internal circumference of the trampoline frame, it is concealed from users. This prevents from users coming into contact with the elongated threaded member 630.

Figure 7:
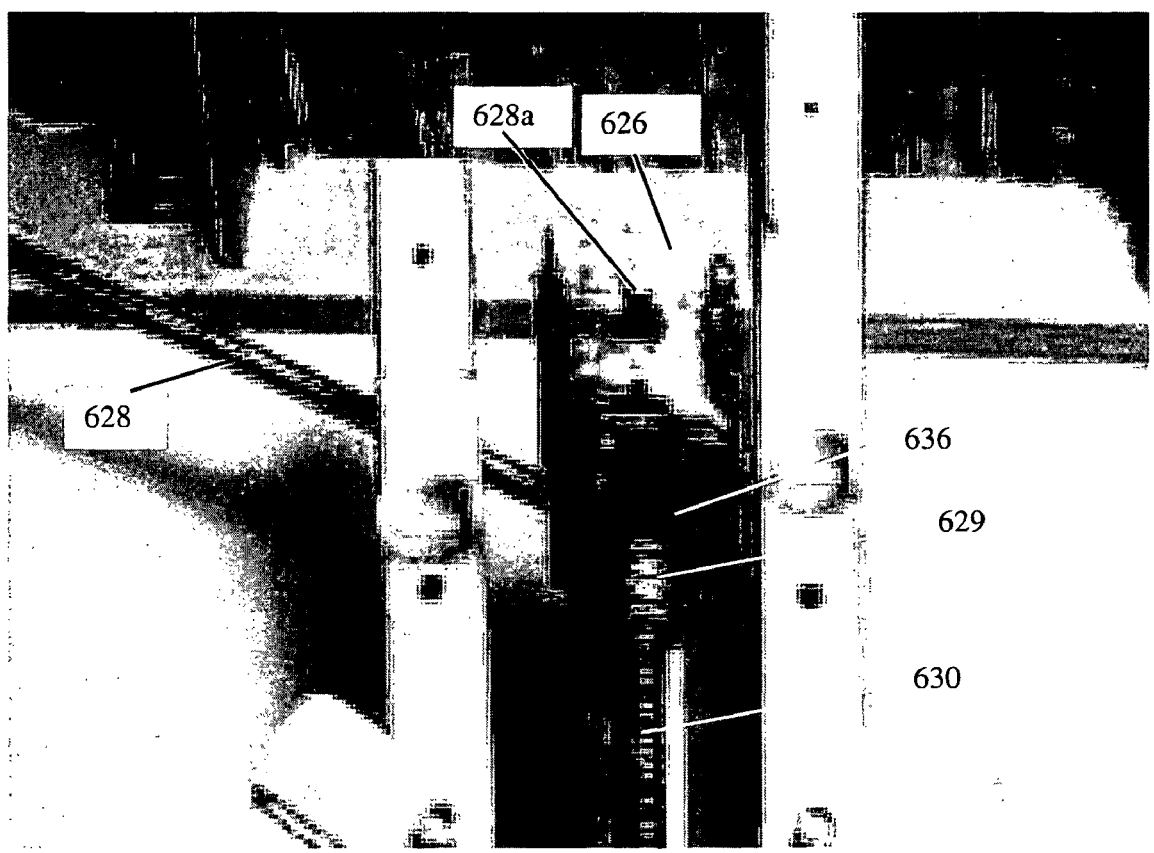
FIG. 7 illustrates a side view of the frame assembly including the gear housing the support bracket and the elongated threaded member.

FIG. 7 illustrates a side view of the frame assembly 600 including the gear housing 626 the support bracket 636 and the elongated threaded member 630. One or more bushings and/or bearings 629 may be positioned on one or both sides of the support bracket 636 along the elongated threaded member 630 to make it easier to turn the threaded member 630 to extend or fold a trampoline. The crank shaft 628 is also illustrated with a section 628a passing through an opening in the gear housing 626.

Figure 8A:
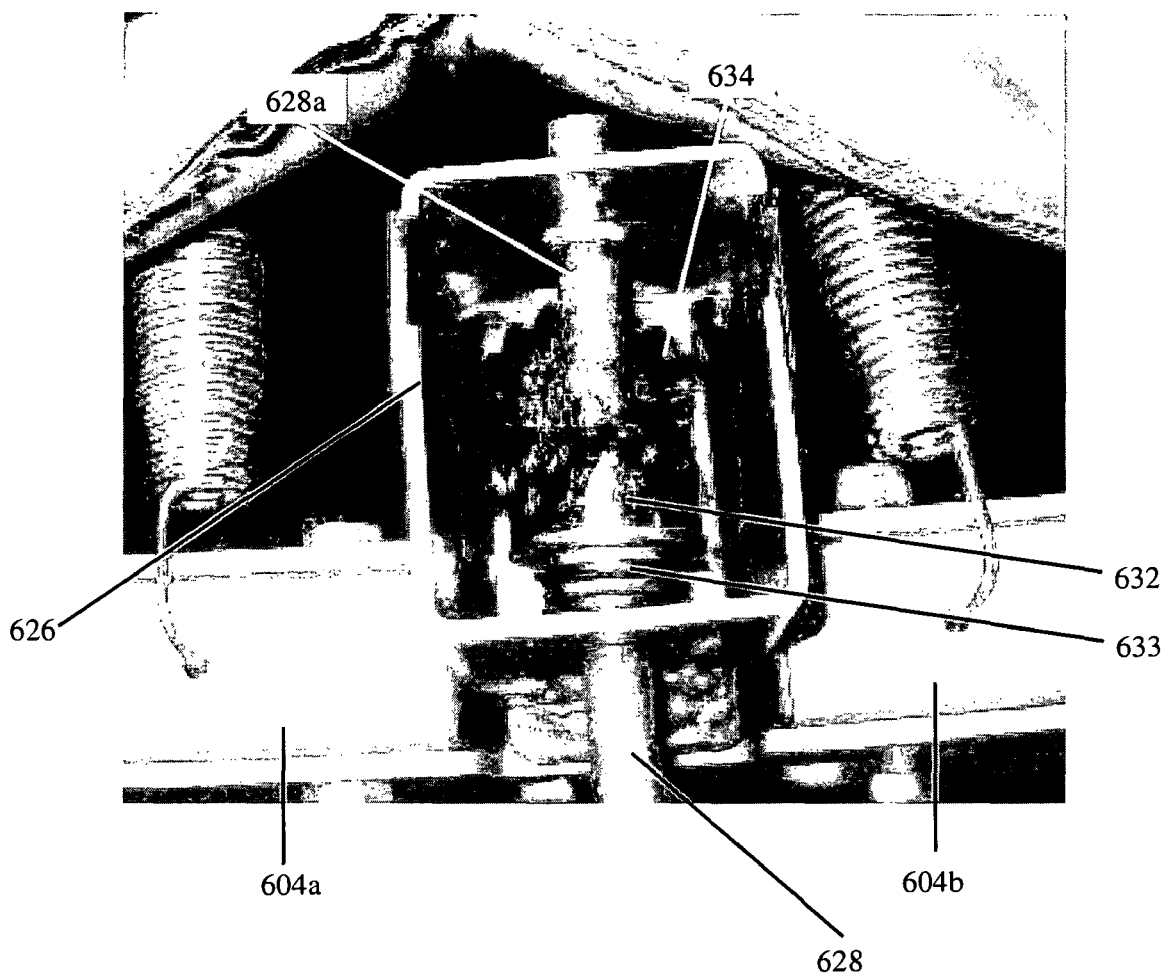
FIG. 8A illustrates a folding mechanism of the foldable trampoline of FIG. 6 according to an embodiment of the invention.

FIG. 8A illustrates a top view of a folding mechanism of a frame assembly according to an embodiment of the invention. The folding mechanism may include the gear housing 626, the crank shaft 628 and the elongated threaded member 630. In one embodiment, the gear housing 626 may be positioned such that it protrudes inwardly relative to the peripheral frame members 604a, 604b, i.e., towards an inner circumference defined by a fully expanded trampoline. The gear housing 626 also includes at least two apertures for receiving the second portion 628a of the crank shaft (or torque portion) and providing steadying force to the crank shaft 628 when force is applied thereto. In one embodiment, the crank shaft 628 includes a first gear 632 (positioned on/about the second portion 628a, or torque portion) in connection with a second gear 634 at approximately ninety (90) degrees thereto wherein the second gear 634 is a head of the elongated threaded member 630. One or more bearings 633 may be positioned between the first gear 632 and the gear housing 626 to prevent the first gear 632 from being disengaged from the second gear 634.

When rotational force (clockwise or counterclockwise) is applied to the crank shaft 628, the second portion 628a turns, causing the first gear 632 to rotate. The rotation of the first gear portion 632 is transferred to the second gear 634 thereby causing the threaded member 630 to turn. As the threaded member 630 turns, it causes a retaining block 638 (coupled to the center bracket 612) to move up or down along the threaded member 630. Moving the center bracket 612 down, causes the frame assembly 600 and therefore the trampoline to fold. Similarly, moving the center bracket 612 up, causes the frame assembly 600, and therefore the trampoline, to unfold. Since the frame assembly 600 is connected to at least two trampoline frame members (i.e., at least two arcuate frame members or a plurality of members comprising at least two arcuate frame members), the trampoline necessarily moves in concert with the frame assembly 600 from a collapsed or folded state to an expanded or unfolded state and vice-versa. In this manner, a trampoline may be folded and unfolded by a single operator.

Figure 8B:
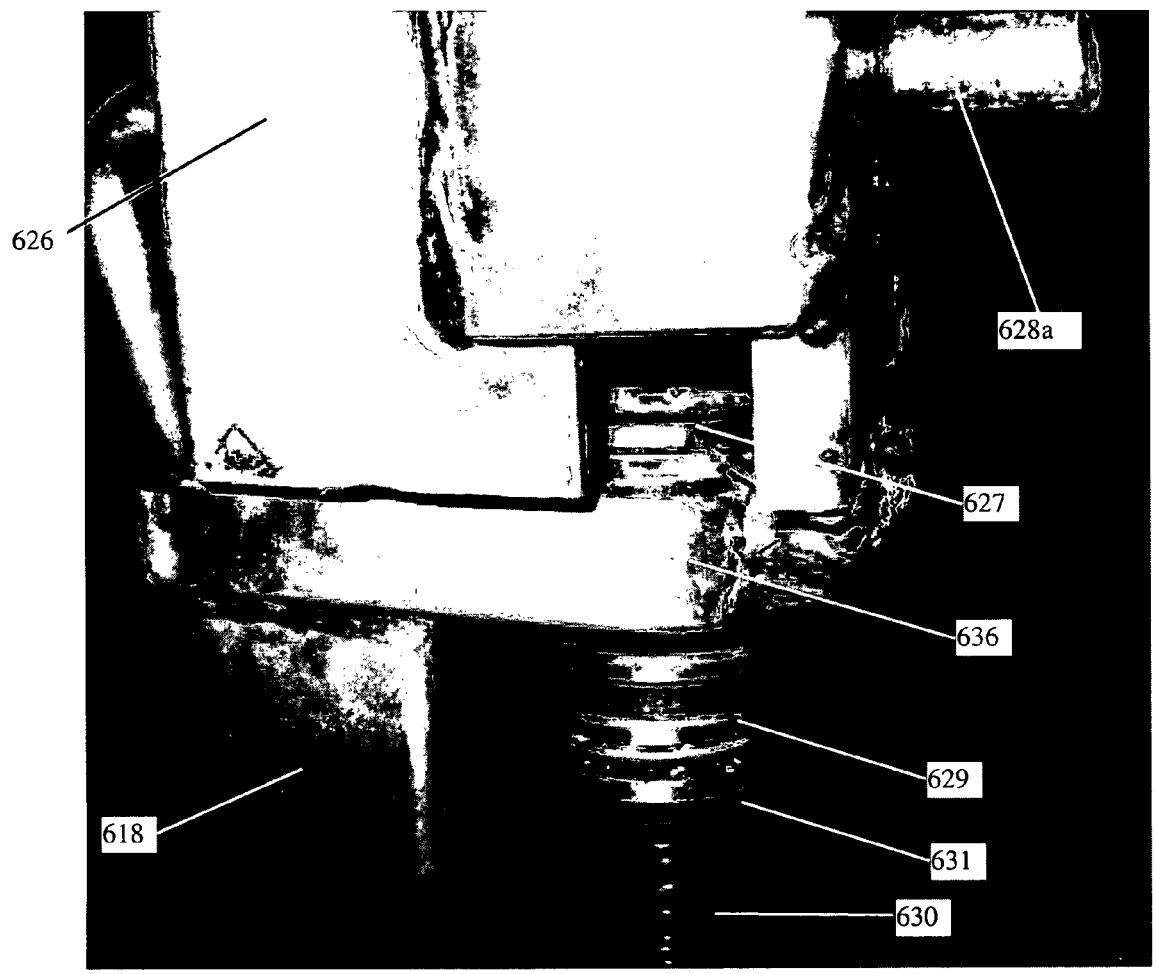
FIG. 8B illustrates a side view of the gear housing 626 with a plurality of bearings, washers and/or bushings on either side of the elongated threaded member 630.

FIG. 8B illustrates a side view of the gear housing 626 with a plurality of bearings, washers and/or bushings on either side of the elongated threaded member 630. In this embodiment, the threaded member 630 may pass through one or more bearings, washers, and/or bushings 627 which are positioned between the second gear 634 and the support bracket 636. The threaded member 630 may also pass through a second set of one or more bearings, washers, and/or bushings 629 which are positioned below the support bracket 636. It should be noted, that different forces are exerted on the threaded member 630. Depending on whether the trampoline is being folded or unfolded and depending on the position of the trampoline peripheral frame members (e.g., 1204a and 1204b FIGS. 12A, 12B, and 13) the threaded member 630 has a force either pushing it up or pulling it down. Consequently, the first and second set of bearings, washers, and/or bushings 627 and 629 serve to counter these forces. To prevent the threaded member 630 from being pushed upward into the first gear 632, a washer 631 may be welded or fixedly coupled to the threaded member 630. When an upward force is exerted on the threaded member 630, the upward force presses the second set of bearings, washers, and/or bushings 629 against the support bracket 636, preventing the threaded member 630 from pushing on the first gear 632. Note that when the threaded member 630 is being pushed downward, the first set of bearings, washers, and/or bushings 627 prevent the second gear 634 from being disengaged from the first gear 632.

Figure 9:
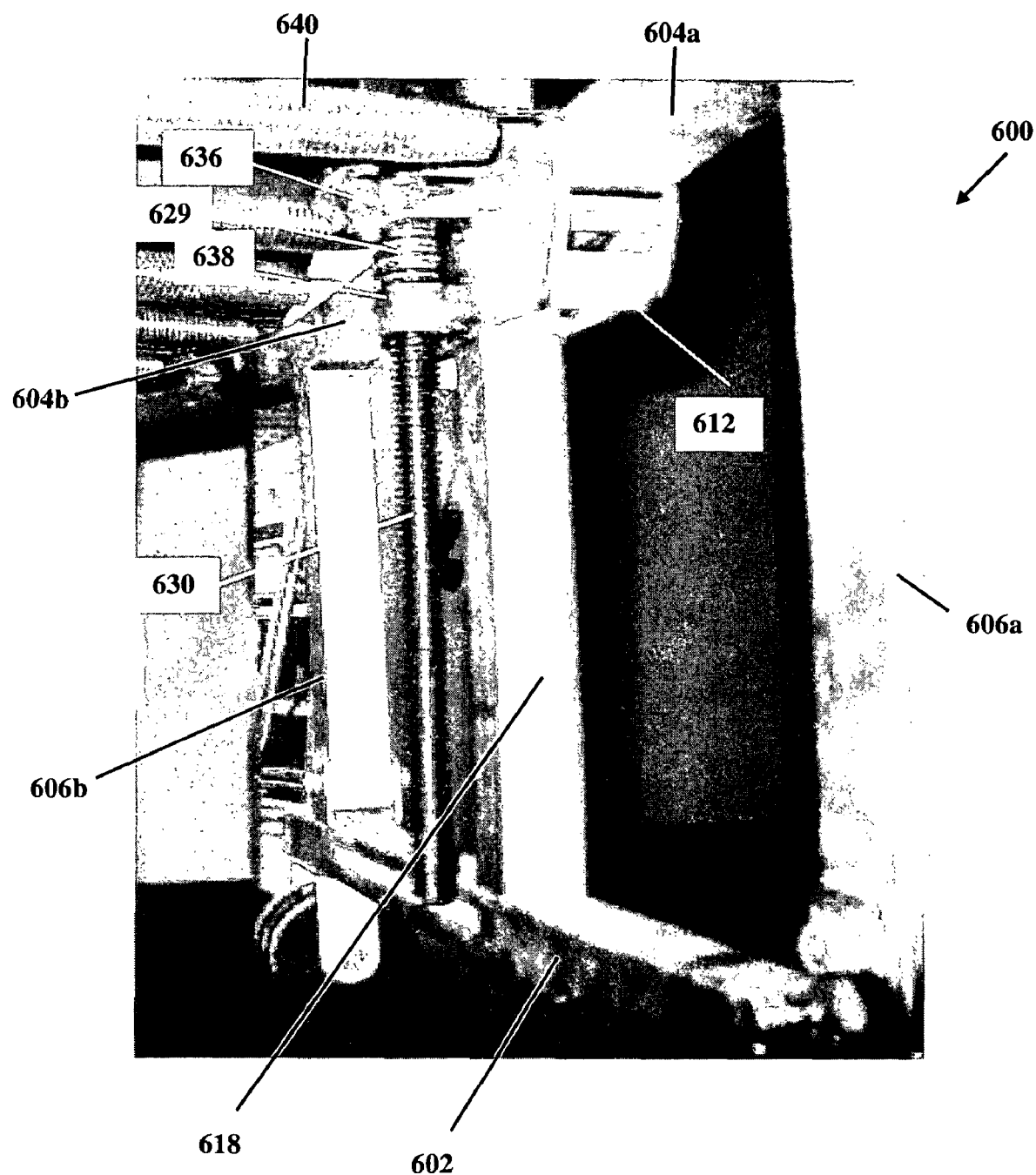
FIG. 9 illustrates an inner view of the frame assembly of FIG. 6 in an expanded state.

FIG. 9 illustrates an inner view of the frame assembly 600 of FIG. 6 in an expanded or unfolded state and supporting a trampoline frame. As shown, the frame assembly 600 includes the base frame member 602, the first peripheral frame member 604a, the second peripheral frame member 604b, and the connecting frame members 606a and 606b. The central frame post 618 is shown slidably engaged with the center bracket 612. The elongated threaded member 630 is shown threadedly engaged with the supporting bracket 636 and a retaining block 638 which is fixedly attached to the center bracket 612. One or more bushings or bearings 629 serve to ease rotation of the elongated threaded member 630. Also shown are a plurality of springs 640 that extend from the first peripheral frame member 604a and the second peripheral frame member 604b to support the jumping web or surface.

Figure 10:
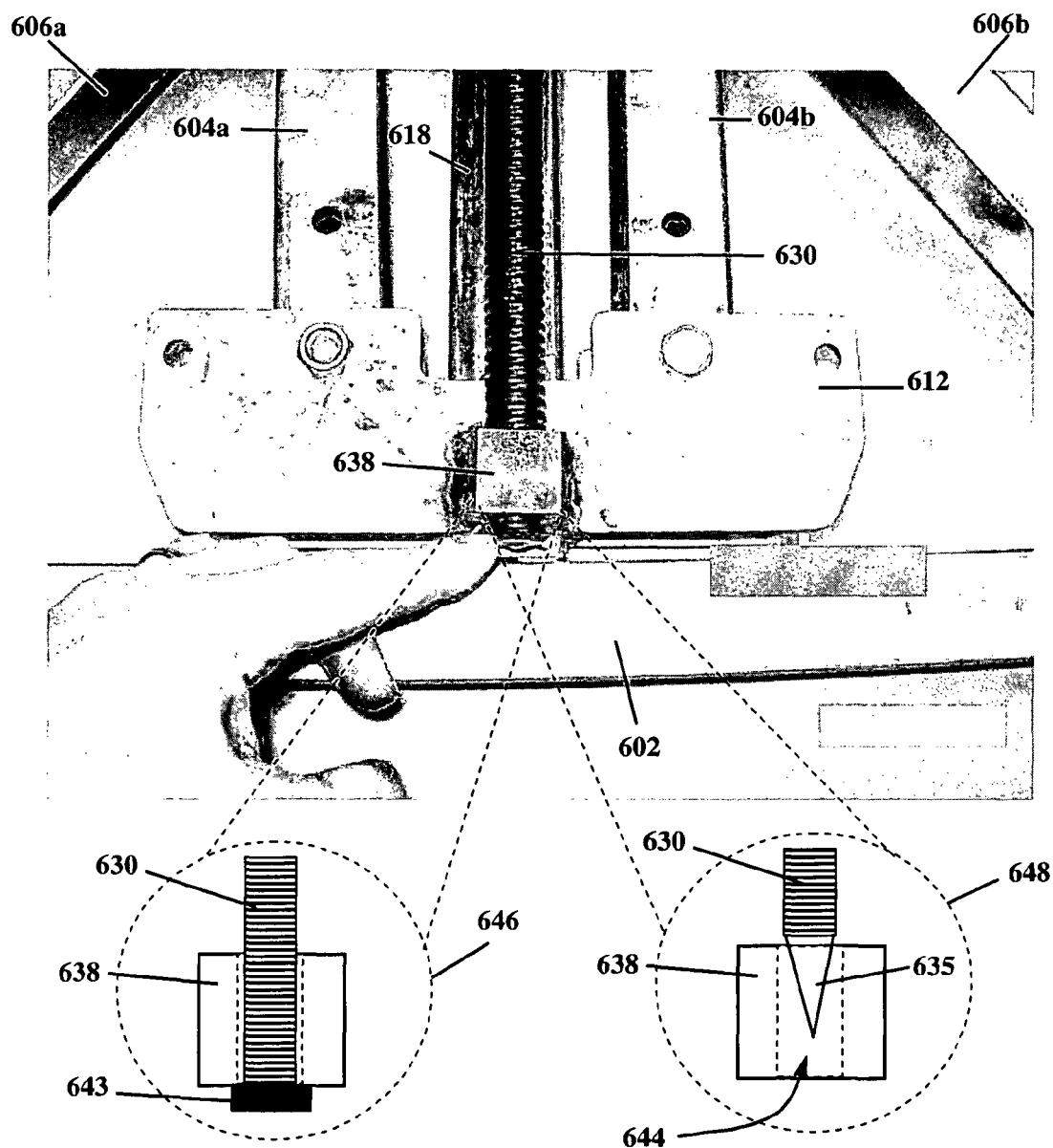
FIG. 10 illustrates a close-up view of a center bracket of the frame assembly of FIG. 6 according to an embodiment of the invention.

FIG. 10 illustrates a close-up view of the center bracket 612 with the elongated threaded member 630 threadedly engaged with the retaining block 638 of the center bracket 612. In this view, the frame assembly 600 is in a collapsed state. The elongated threaded member 630 may be sized to approximately match the length of the center frame post 618. Note that if the threaded member 630 is too long, the center bracket 612 may be unscrewed and pushed into the base frame member 602, thereby damaging or bending the base frame member 602. To prevent this, the elongated threaded member 630 may be sized such that contact between the center bracket 612 and the base frame member 602 is avoided or completely prevented as the threaded member is unscrewed. The retaining block 638 may define a threaded opening 644 through which the threaded member 630 passes. In one embodiment, illustrated as 646, the elongated threaded member 630 may have a stopper 643 that prevents the threaded member 630 from unscrewing from the retaining block 638. Such stopper 643 may be positioned so that it prevents the center bracket 612 from being pressed against the base frame member 602. In another embodiment, illustrated as 648, the elongated threaded member 630 may terminate in a pointed end 635 such that at least some portion of the pointed end 635 remains within the threaded opening 644 of the retaining block 638 when the frame assembly 600 is an a collapsed state. Thus, the center bracket 612 may be disengaged from the threaded portion of the threaded member 630 but the pointed end 635 allows the threaded member 630 to remain aligned with the threaded opening 644.

Figure 11:
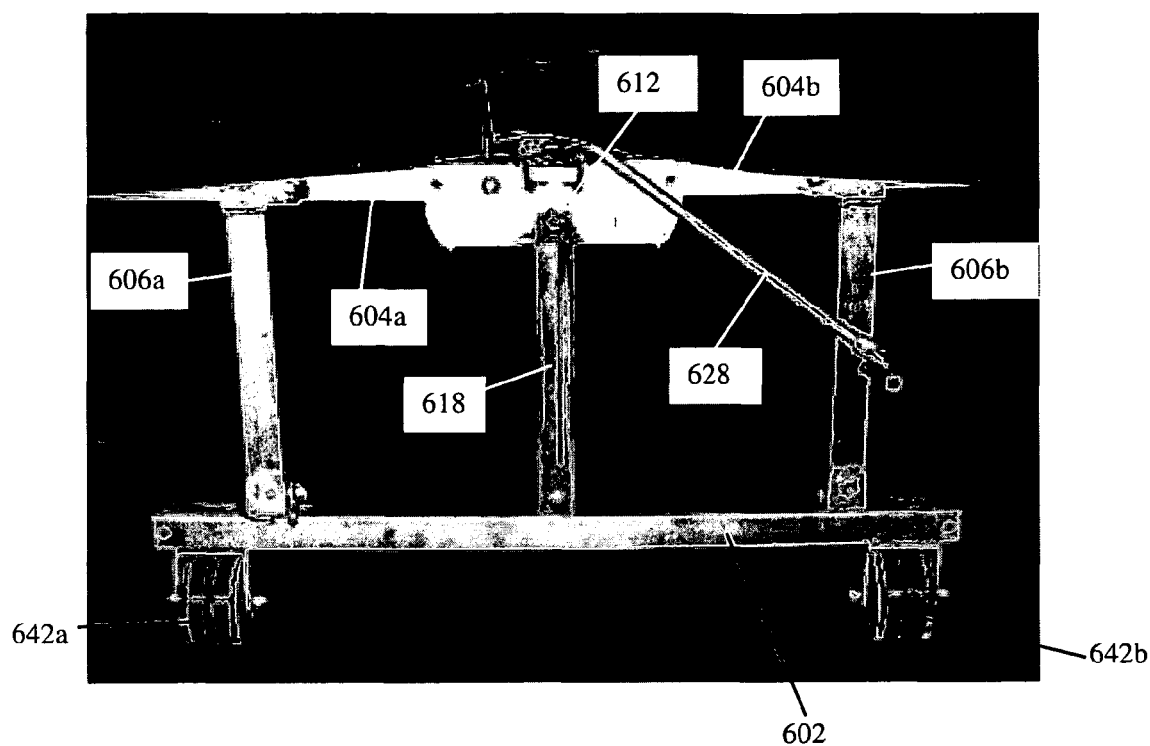
FIG. 11 illustrates the frame assembly of FIG. 6 in an expanded state and supporting a trampoline according to an embodiment of the invention.

FIG. 11 illustrates the frame assembly 600 of FIG. 6 in an expanded state and supporting a trampoline according to an embodiment of the invention. The base frame member 602, the first peripheral frame member 604a, the second peripheral frame member 604b, connecting frame members 606a and 606b and the center bracket 612 are shown. The frame assembly 600 may include wheels 642a and 642b to facilitate the positioning of the frame assembly 600 to a trampoline.

Figure 26:
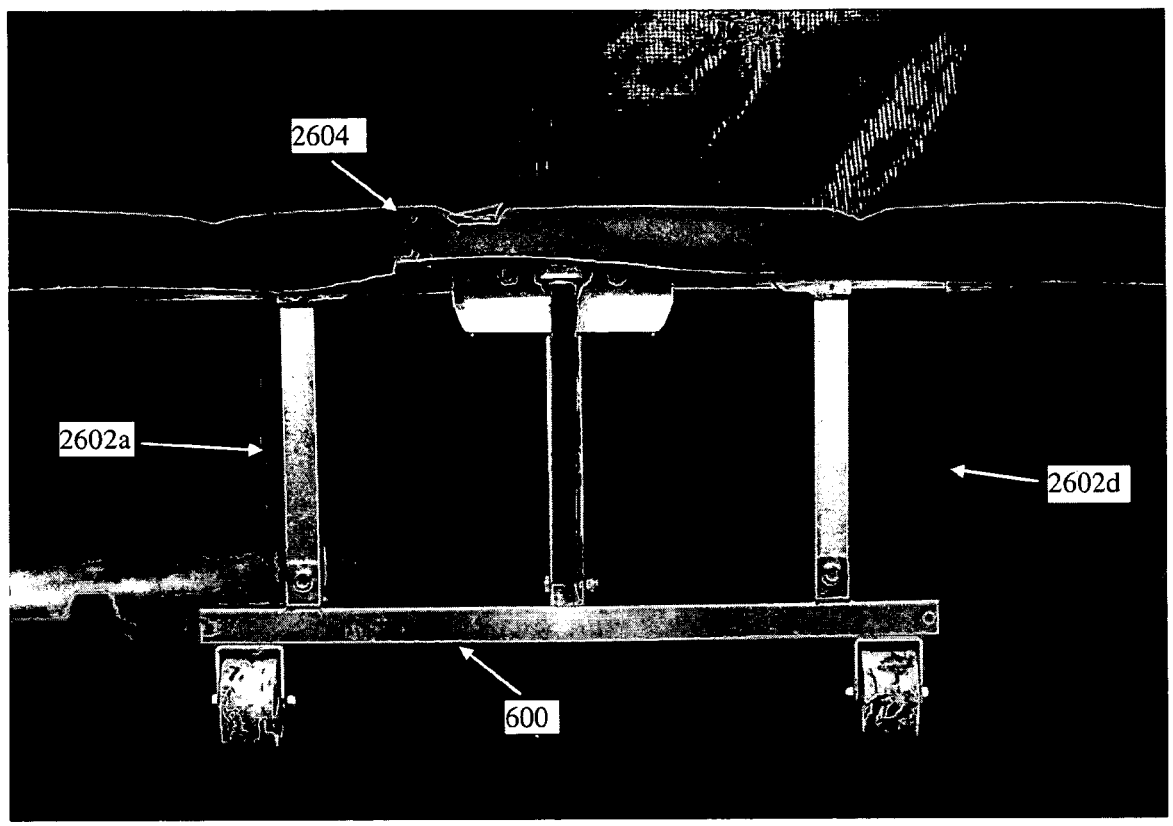
FIGS. 26 and 27 illustrate how the frame assembly is coupled to a peripheral frame for the trampoline and suspended in the air when a plurality of trampoline supports are supporting the trampoline frame.
Figure 27:
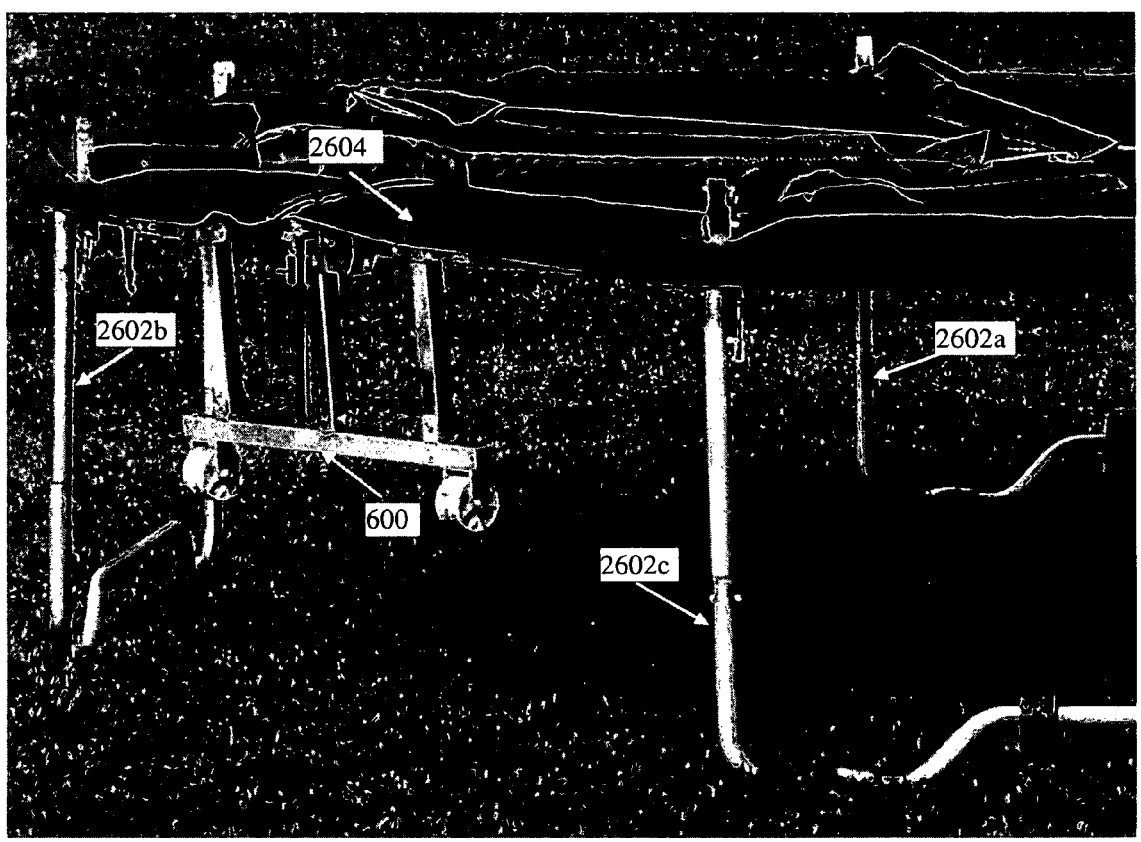

FIGS. 26-29 illustrate how a frame assembly 600 for folding a trampoline may be implemented in one example. FIGS. 26 and 27 illustrate how the frame assembly 600 is coupled to a peripheral frame 2604 for the trampoline and suspended in the air when a plurality of trampoline supports 2602a, 2602b, 2602c, and 2602d are supporting the trampoline frame 2604.

Figure 28:
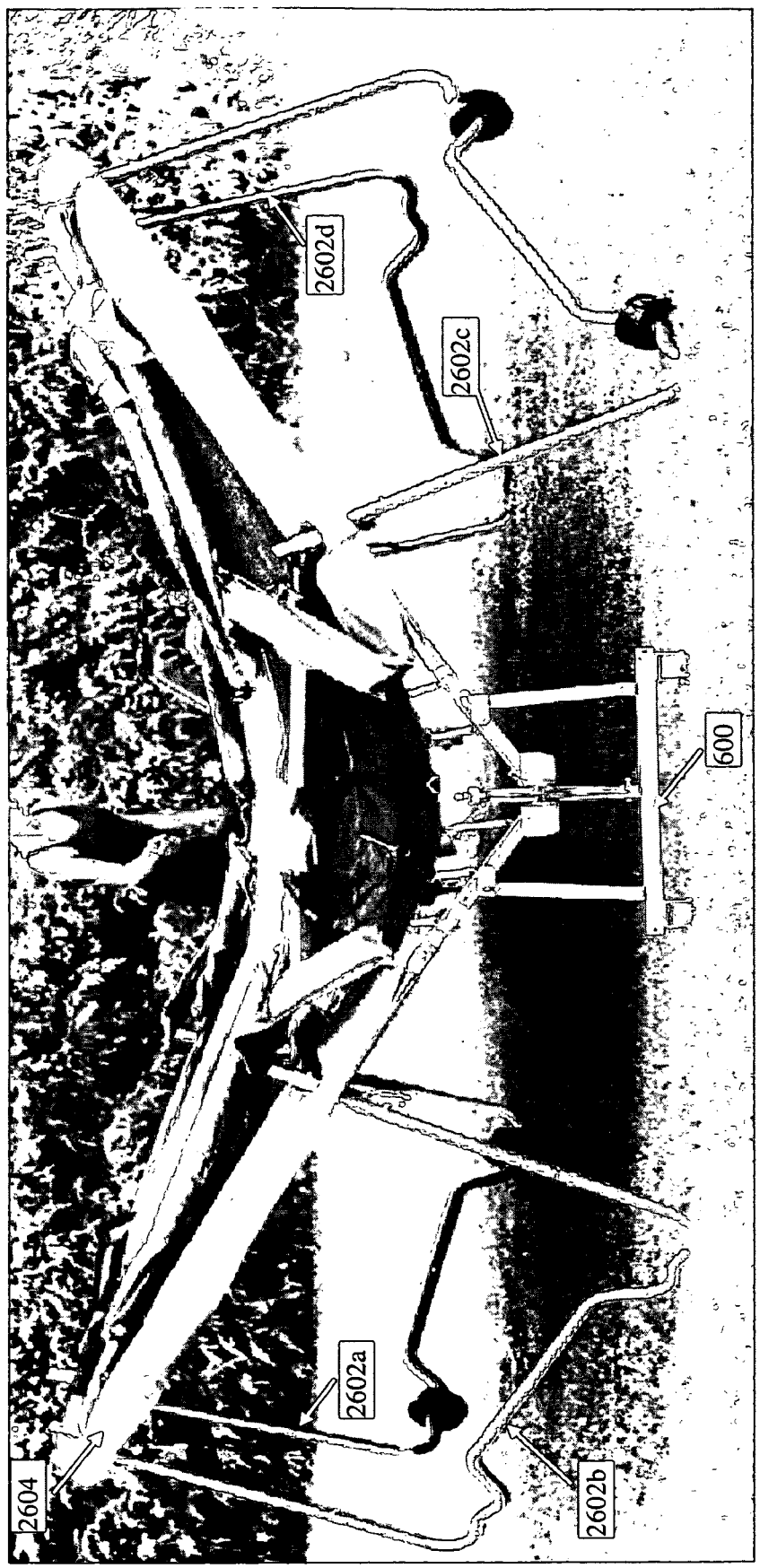
FIG. 28 illustrates a partially folded trampoline where the folding frame assembly has been partially folded thereby causing the supports to partially lift off the ground and, consequently, the frame assembly has been lowered to the ground.

FIG. 28 illustrates a partially folded trampoline where the folding frame assembly 600 has been partially folded thereby causing the supports 2602a, 2602b, 2602c, and 2602d to partially lift off the ground and, consequently, the frame assembly has been lowered to the ground.

Figure 29:
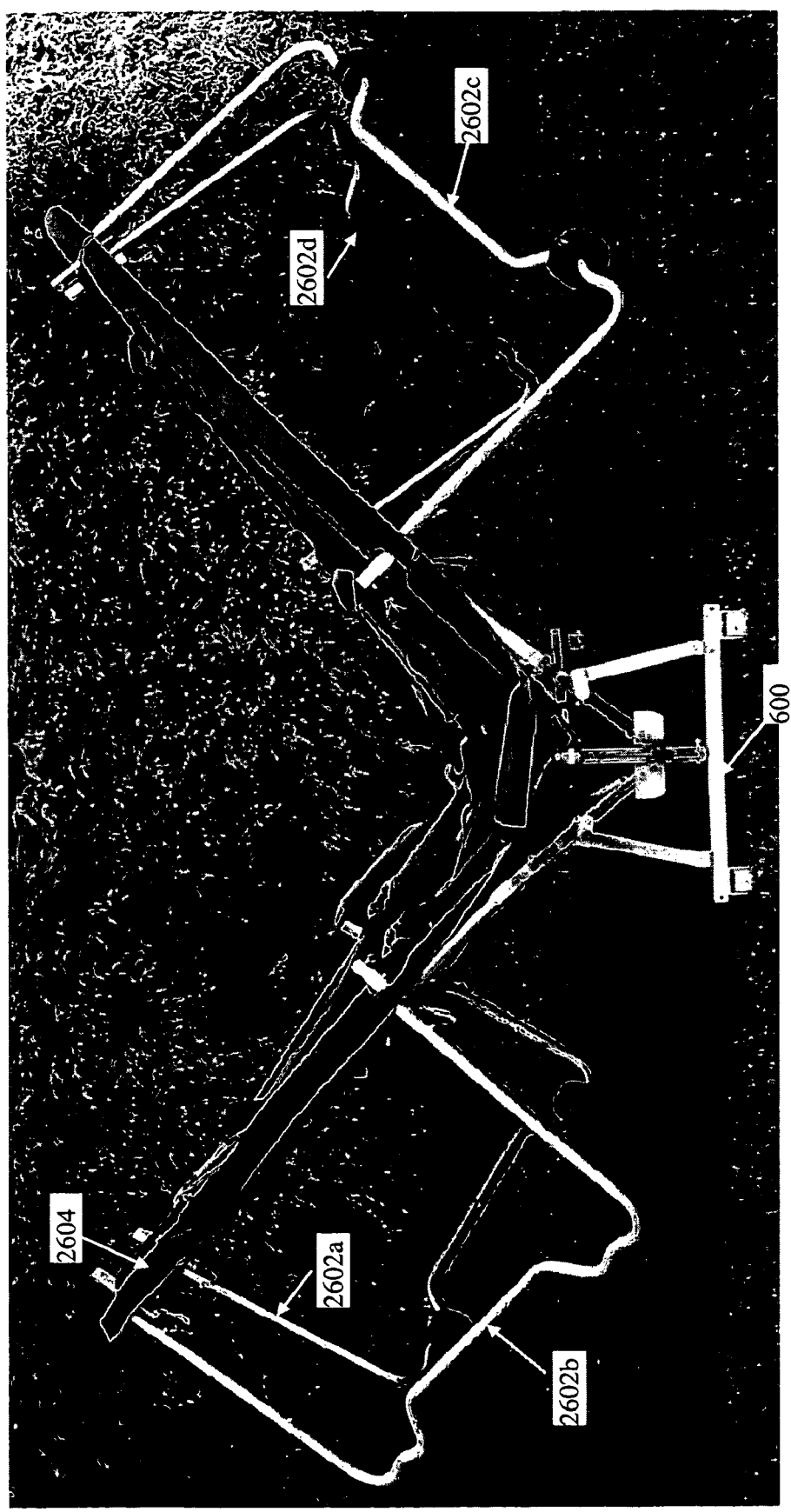
FIG. 29 illustrates a partially folded trampoline where the folding frame assembly has been partially folded thereby causing the supports to fully lift off the ground.

FIG. 29 illustrates a partially folded trampoline where the folding frame assembly 600 has been partially folded thereby causing the supports 2602a, 2602b, 2602c, and 2602d to fully lift off the ground.

For the folding mechanism to operate, at least a first and a second frame assembly (e.g., 600a and 600b in FIG. 13) may be coupled opposite each other to the trampoline frame. In one example, the first frame assembly may have an elongated threaded member 630 while the second frame assembly may exclude such elongated threaded member. In another implementation, both the first and second frame assemblies may have an elongated threaded member.

In one instance, the first and second frame assemblies may each have an elongated threaded member 630 that is approximately the length of the center frame post 618. To fold or unfold the trampoline, an operator may alternate between turning the threaded member of the first frame assembly and turning the threaded member of the second frame assembly until the trampoline is fully folded or unfolded.

In another instance, the first frame assembly may have an elongated threaded member 630 that is approximately the length of the center frame post 618 while the second frame assembly may have a different elongated threaded member that is approximately half the length of the center frame post 618. Note that as the trampoline frame is folded from a fully unfolded state, greater force is exerted when the trampoline frame is fully unfolded but such force decreases as the trampoline frame is folded. Consequently, in this embodiment a half-length threaded member is used to assist the full-length threaded member when the trampoline frame is more than half unfolded. That is, since a greater force is exerted when the trampoline frame is fully unfolded or is more than half unfolded, using two threaded members makes it easier to fold the trampoline. When folding a trampoline, once the trampoline frame is partially folded (meaning that less force will need to be exerted to finish folding the trampoline frame), then the half-length threaded member becomes disengaged from the retaining block 638 and the full-length threaded member can continued to be turned by itself to fully fold the trampoline. Similarly, when unfolding the trampoline, once the trampoline frame is partially unfolded (meaning that more force will need to be exerted to finish unfolding the trampoline frame), then the half-length threaded member becomes engaged to the retaining block 638 and both the half-length and full-length threaded members can be turned to fully unfold the trampoline frame.

Trampoline Conversion Kit

In some embodiments the frame assembly of FIGS. 6-11 and 26-29 may be part of a conversion kit that converts a non-folding trampoline to a folding trampoline.

Figure 12A:
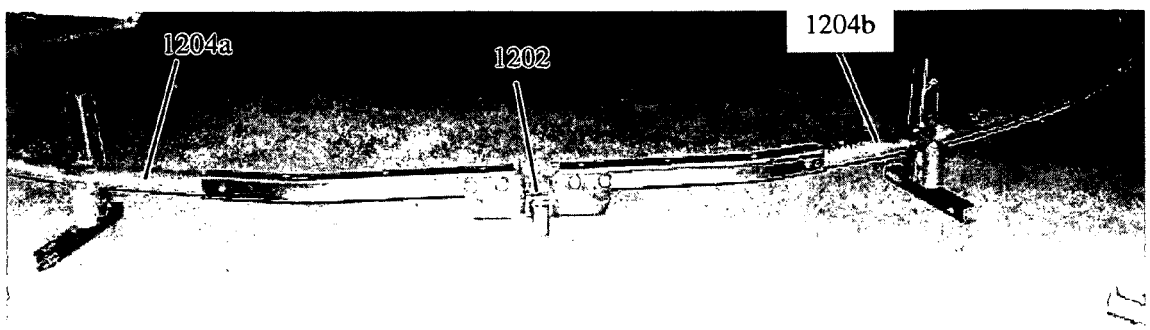
FIGS. 12A and 12B illustrate how non-folding trampoline may include various types of joining brackets to keep a first trampoline frame member and a second trampoline frame member fixedly coupled to each other.
Figure 12B:
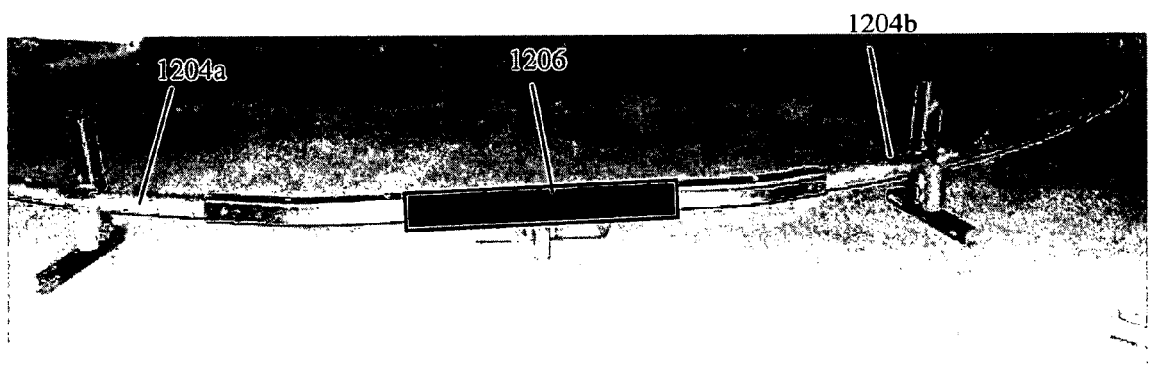

FIGS. 12A and 12B illustrate how non-folding trampoline may include various types of joining brackets 1204 and 1206 to keep a first trampoline frame member 1204a and a second trampoline frame member 1204b fixedly coupled to each other. In FIG. 12A, a short joining bracket 1202 is illustrated, where the short bracket 1202 is coupled to each of the first and second trampoline frame members 1204a and 1204b with two bolts that prevent the frame members 1204a and 1204b from folding. FIG. 12B illustrates a long joining bracket 1206 the fixedly couples the first and second trampoline frame members 1204a and 1204b together, thereby preventing them from folding.

In one example, a non-folding trampoline may include two arcuate frame members (e.g., 1204a and 1204b in FIGS. 12A, 12B, and 13) that are fixedly attached to each other at the ends. A joining bracket (e.g., 1202 or 1206 in FIGS. 12A and 12B) may be used to fixedly attach the arcuate frame members to each other by using bolts or pins that pass through both the arcuate frame members and the joining bracket.

To convert such non-folding trampoline to a folding trampoline, the joining bracket (e.g., 1202 or 1206 in FIGS. 12A and 12B) is removed. In its place a frame assembly (e.g., 600a and 600b in FIG. 13) may be attached to either side of the arcuate frame members (e.g., 1204a and 1204b in FIGS. 12A, 12B, and 13). Each end of the arcuate frame members (e.g., 1204a and 1204b in FIGS. 12A, 12B, and 13) may be coupled to a frame member 604a or 604b using the same openings as used by the joining bracket. Note that just one of the frame assemblies (e.g., 600a or 600b in FIG. 13) may include a full-length threaded member 630 of FIG. 6. The other frame assembly may exclude the threaded member or may include a half-length threaded member.

Figure 13:
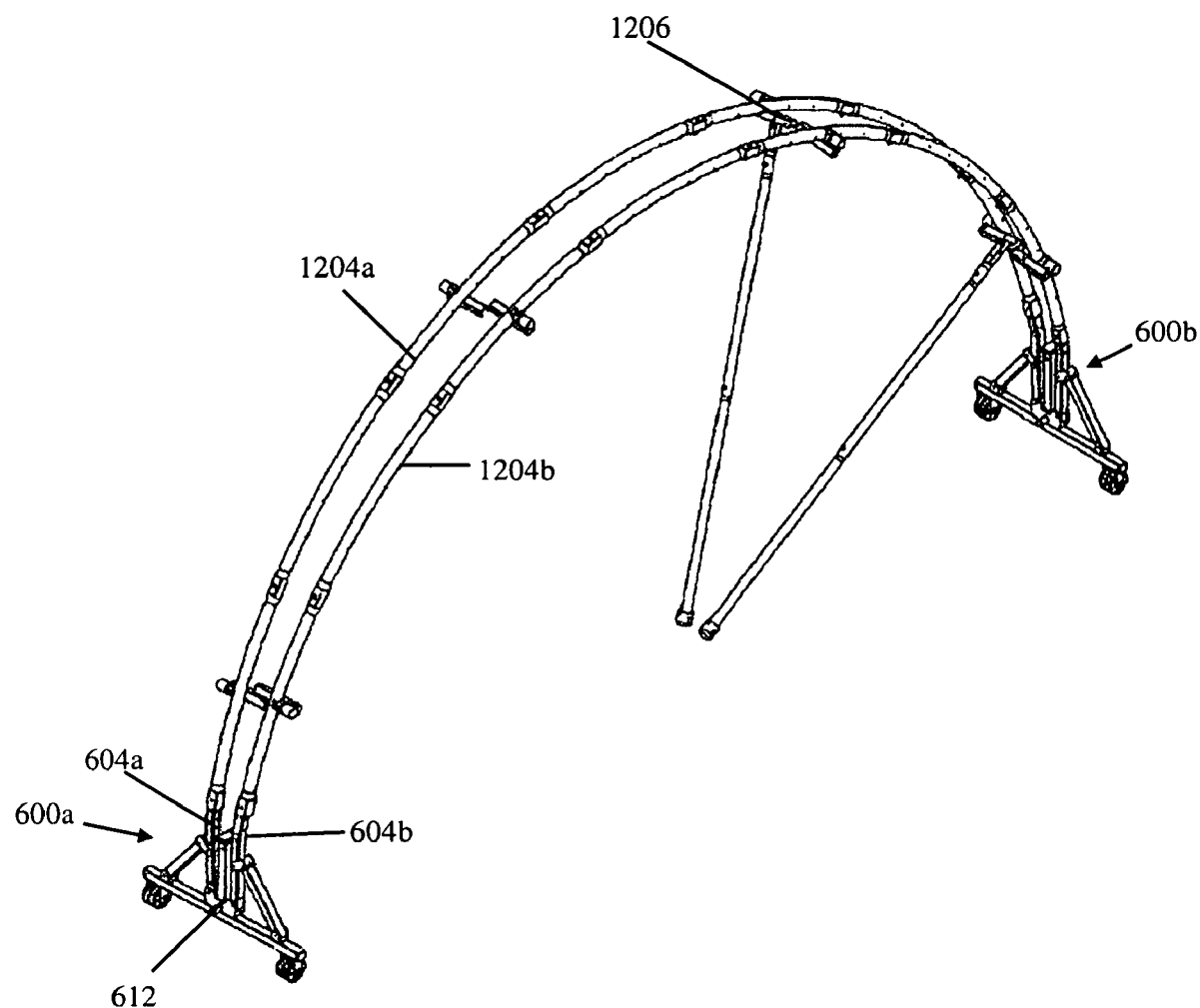
FIG. 13 illustrates a perspective view of a trampoline frame supported by a frame assembly in a collapsed state according to an embodiment of the invention.

The trampoline conversion kit may include at least a first folding frame assembly (e.g., as illustrated in FIGS. 6-11) and/or at least a second folding frame assembly (e.g., as illustrated in FIGS. 3-5) capable of converting a non-foldable trampoline to a foldable trampoline Offset Frame Assembly FIG. 13 illustrates a perspective view of a trampoline frame supported by a frame assembly in a collapsed state according to an embodiment of the invention. As shown, the trampoline frame is supported by a frame assembly such as that described with reference to FIGS. 6-11. Note that the frame assembly may comprise two sections 600a and 600b that facilitate folding of the trampoline. In one example, just one of the two sections 600a or 600b may have the threaded member and folding mechanism illustrated in FIGS. 6-11. The other section may simply have the folding mechanism without the threaded member.

The frame members 604a and 604b may be coupled to arcuate peripheral frame members 1204a and 1204b of the trampoline. Each arcuate frame member 1204a and 1204b may be comprised of a plurality of members/section or, alternatively, may be a unitary member. The arcuate frame members 1204a and 1204b may be made of galvanized steel or like material. The ends of each arcuate frame member 1204a and 1204b may couple to a corresponding frame member 604a and 604b.

Note that if the frame members 604a/604b and 1204a/1204b are completely symmetrical, when folded they may obstruct each other. To allow the trampoline to fold better, the frame members 604a/604b and/or 1204a/1204b may be slightly offset from each other. In one example, the frame members 604a and 604b may be off-set relative to each other at the point of connection to the center bracket 612. In this manner, when folded, net supporting members (e.g., springs, safety net support brackets 1206, etc.) do not contact each other thereby preventing damage to the trampoline frame and/or allowing the trampoline to fold completely. In one embodiment, frame member 604a is longer that the frame member 604b, thereby causing the arcuate frame members 1204a and 1204b to be slightly offset from each other when folded. In another embodiment, the arcuate frame members 1204a and 1204b may be of different lengths, thereby causing the arcuate frame members 1204a and 1204b to be offset from each other.

Hydraulic-Assisted Frame Assembly

According to an alternative feature, the frame assembly may include at least two hydraulic cylinders or pistons connecting the base frame member to the center bracket. A hydraulic cylinder or piston is a mechanical actuator that is used to give a linear force through a linear stroke. One of ordinary skill in the art will appreciate that a typical hydraulic cylinder or piston includes the following parts: a cylinder barrel; a cylinder bottom; a cylinder head, a piston, a cylinder bottom connection; a piston rod connection; and feet for mounting the barrel. Additionally, one of ordinary skill in the art will appreciate that a hydraulic cylinder should be used for pushing and pulling and no bending moments should be transmitted to the cylinder. For this reason, the hydraulic cylinders may be connected at one end to the base frame member by a single clevis with a ball bearing. Safety stops on the base frame member and in the line of the center bracket (during movement about the center post) may serve to stop the center bracket from contacting the base frame member when the frame assembly is folded, thereby preventing a user's fingers or hand from being pinched. The hydraulic cylinders may be pivotably connected at an opposite end via the piston rod connection to center bracket.

In some embodiments, the hydraulic cylinders may assist in controlling the movement of the frame assembly from a collapsed state to an expanded state or vice-versa. For example, the hydraulic cylinders may substantially or completely assist in preventing the frame assembly from "snapping" thereby causing injury to the user when moving the frame assembly from a collapsed state to an expanded state or vice-versa. Also, the hydraulic cylinders may provide a retaining function which may eliminate the need for the folding mechanism as described previously.

Safe Folding Trampoline Safety Net

Figure 14A:
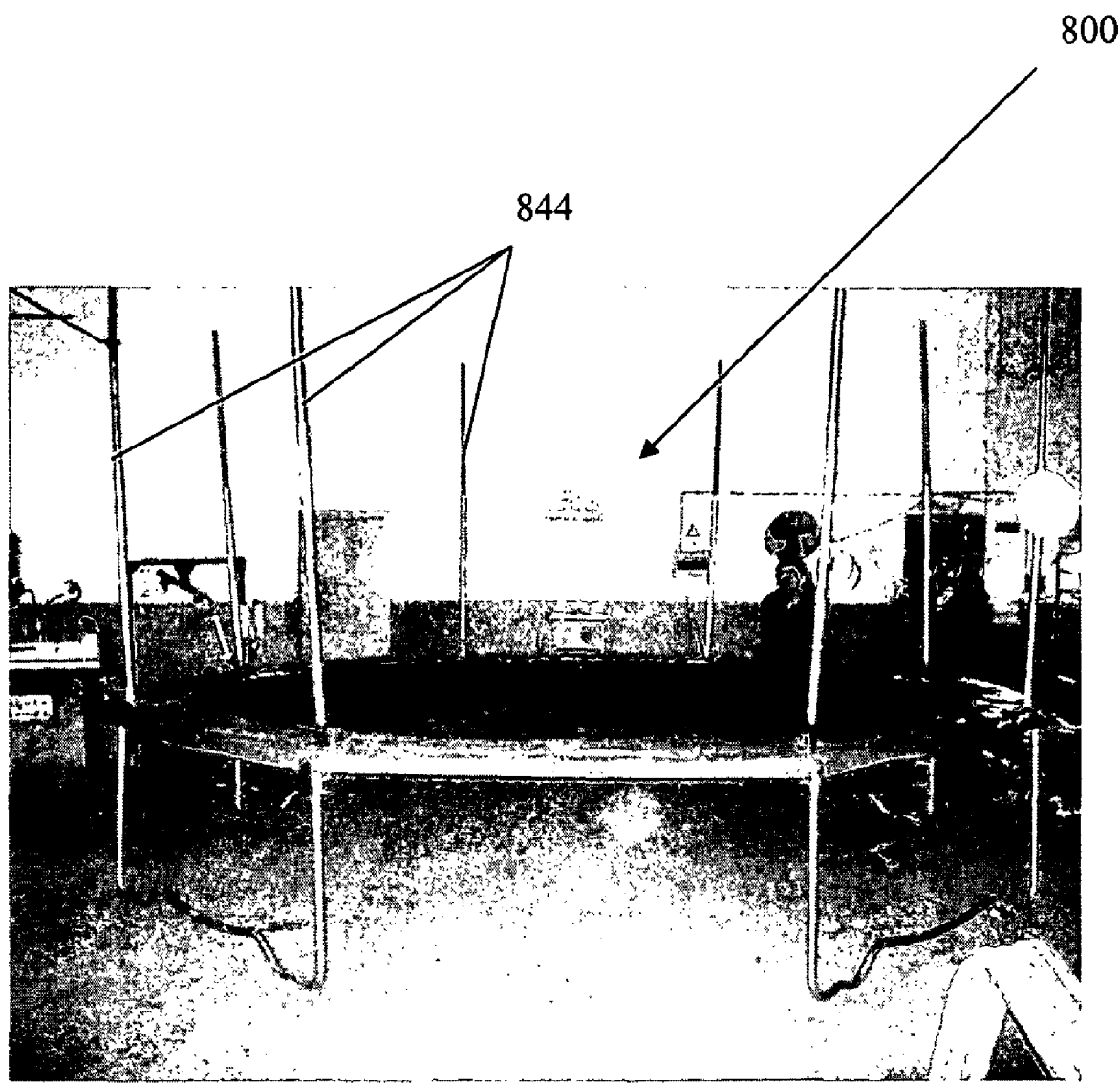
FIG. 14A illustrates a perspective view of a trampoline frame with a plurality of net frame members in an expanded state according to an embodiment of the invention.

FIG. 14A illustrates a perspective view of a trampoline frame with a plurality of net frame members in an expanded state according to an embodiment of the invention. As shown, a plurality of net frame members 844 are situated about a trampoline frame 800 which net frame members 844 may support a safety net around the perimeter of the trampoline. The net frame members 844 may be substantially tubular in shape; however, other geometric configurations are within the scope of the invention. The net frame members 844 may be made of galvanized steel or like material. According to some embodiments, the net frame members 844 may pivotably connect to the trampoline frame 800 where the trampoline frame 800 may be annular, rectangular or any other suitable geometric configuration. The net frame members 844 may be angled slightly outwardly to compensate for an inward force that may be exerted by a safety net that is hung under tension. In various embodiments, the net frame members 844 may be coupled to receiving members 848a (FIGS. 15 and 16) by coupling to second members 848b.

Figure 14B:
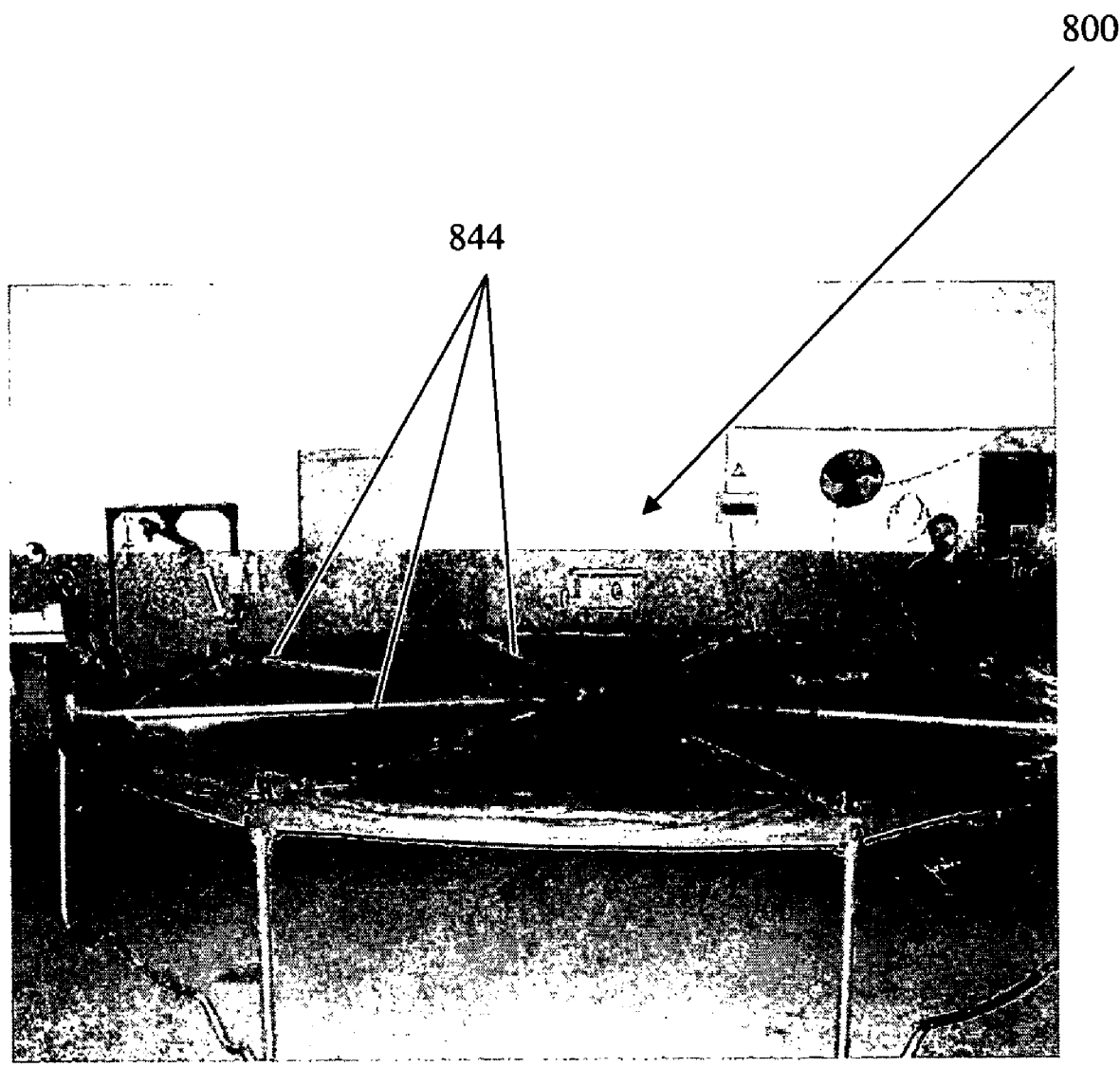
FIG. 14B illustrates a perspective view of the trampoline frame of FIG. 14A with a plurality of net frame members in a collapsed state.

The net frame members 844 may be pivotably connected to the perimeter of the trampoline frame 800. To facilitate folding of the trampoline, the net frame members 844 may be folded from extended state to a collapsed state and vice-versa. For example, when positioned in the extended state (FIG. 14A), the net frame members 844 may be vertical relative to a horizontal surface and adapted to retain the trampoline safety net around the perimeter of the trampoline. When positioned in the collapsed state (FIG. 14B), the net frame members 844 may be approximately horizontal relative to a horizontal surface (and to a surface of the trampoline rebounding surface) and ready for storage.

Figure 15:
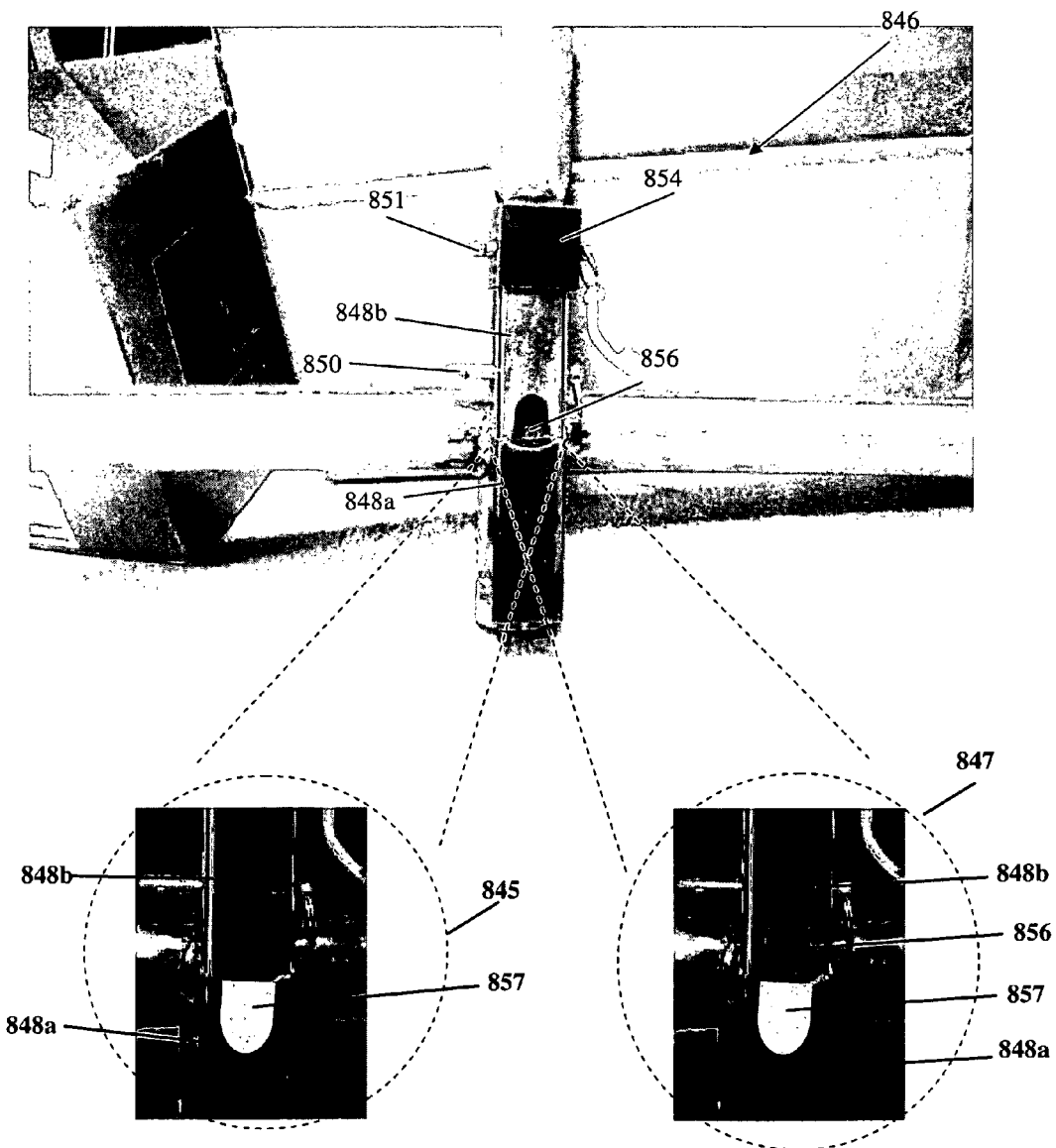
FIG. 15 illustrates an inner view of a pivot joint in an expanded state which may be used to connect a net frame member according to an embodiment of the invention.
Figure 16:
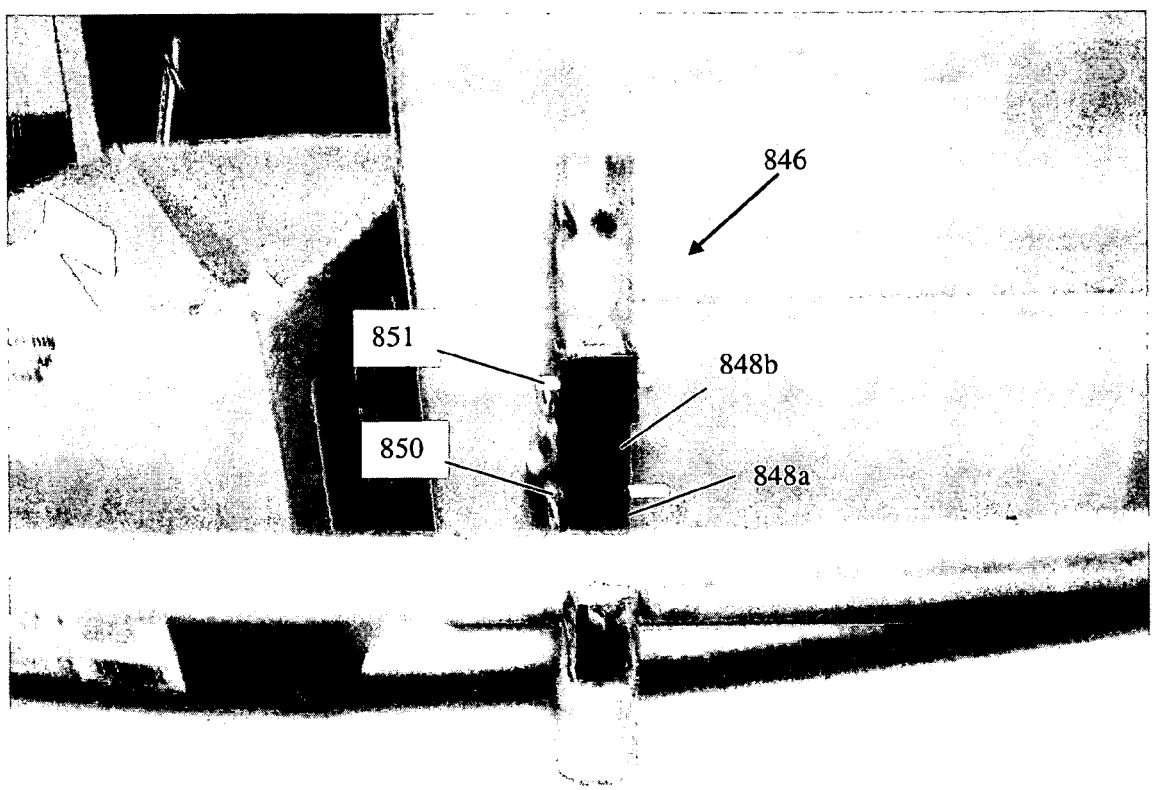
FIG. 16 illustrates an outer view of the pivot joint of FIG. 15.

The plurality of net frame members 844 may be pivotably connected to the trampoline frame 800 by connecting means such as a pivot joint 846 as shown in FIGS. 15-16. In one embodiment, the pivot joint 846 comprises a first member 848a and a second member 848b. The first member 848a may by substantially hollow and may have a proximal end and a distal end. The proximal end may be enclosed while the distal end may be substantially enclosed, i.e., the distal end may have at least one open face. The second member 848b may also be substantially hollow and adapted to connect to an end of a net frame member 844. The first member 848a may be adapted to receive the second member 848b. In that respect, the first and second members 848a and 848b should be approximately the same geometric shape (i.e., tubular, rectangular tubular, etc.). Also, a releasable first retaining pin 850 may connect the first member 848a to the second member 848b, particularly near or at a point where a median portion of the first member 848a and the proximal end of the second member 848b intersect. A second retaining pin 851 may serve to fixedly couple the first and second members 848a and 848b. In this manner, the second member 848b (which may be integral with a net frame member 844) may be pivotable relative to one another. A groove 852 (not shown, see FIG. 17) in the second member 848b allows the second member 848b (and the net frame member 844 attached thereto) to be lifted up and folded while pivoting at the first retaining pin 850 (see FIG. 17).

When the second member 848b is in the extended position, the second retaining pin 851 may serve to further secure the second member 848b to the first member 848a. A collar 854 may slip over the upper portion of the first member 848a to further secure the second member 848b to the first member 848a and to hold the joint member 846 erect. When being positioned from a collapsed state to an extended state (or vice-versa), a user may use the second retaining pin 851 to either couple or release the second member 848b from the first member 848a to allow for pivoting thereof.

In prior art pivot joints, a finger of the user is subject to being caught within the pivot joint with the potential to cause serious injury. The pivot joint according to embodiments of the invention, however, includes an aperture 856 at a portion where the first member 848a connects to the second member 848b (see FIG. 15). In this manner, a user's finger or fingers is/are substantially protected from accidentally being caught within the pivot joint 846 when collapsing or expanding each net frame member 844. That is, the aperture 856 allows one or more fingers to fit therein without substantial injury. As illustrated in FIG. 15, the aperture 856 prevents the user's fingers from being pinched even when the second member 848b slides up or down on the first member 848b. Were it not for the aperture 856, the user's finger may be accidentally crushed. Additionally, the collar 854 slips over the end of the first member 848a to prevent each net frame member 844 from folding down by accident or mistake.

In FIG. 15, a first alternative embodiment 845 is illustrated where the aperture is located in the first member 848a instead of in the second member 848b. A second alternative embodiment 847 is also illustrated in which apertures are located in both the first member 848a and the second member 848b.

Note that in various embodiments, the receiving first member 848a may be positioned inside the perimeter of the trampoline frame or outside the perimeter of the trampoline frame. When located outside the perimeter of the trampoline frame, the net frame members 844 collapse inward. In such case, to prevent an operator's hand from being crushed between the trampoline frame and the net frame member, the net frame member has a pivot point higher on the first member 848a.

Figure 17:
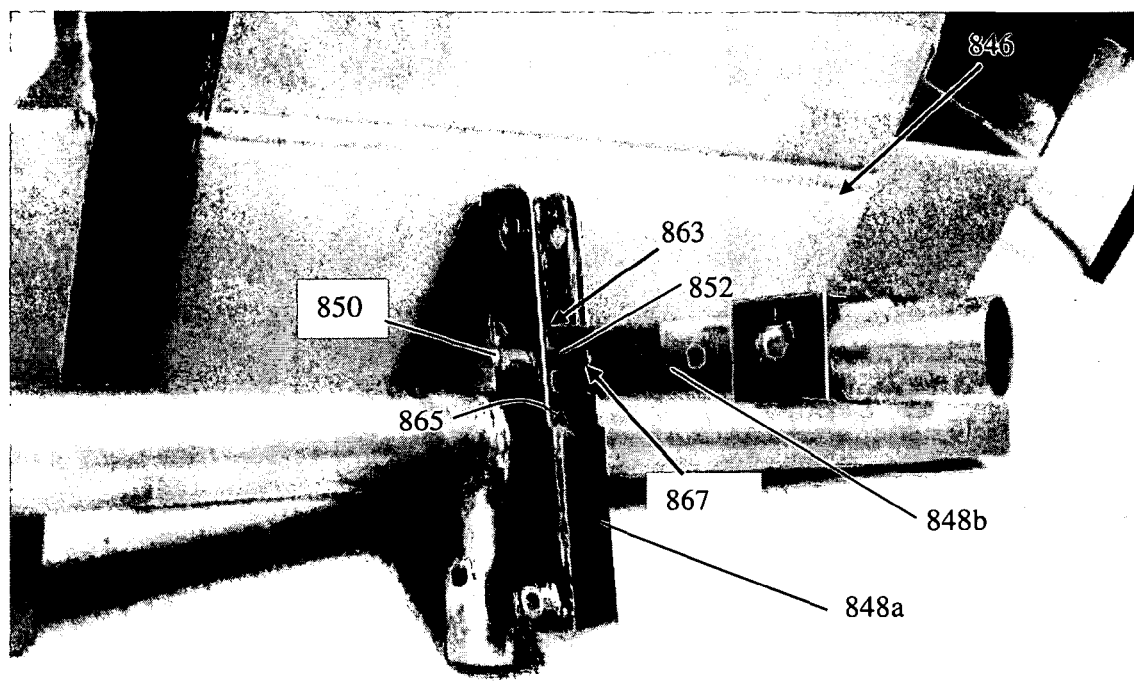
FIG. 17 illustrates a perspective view of the pivot joint of FIG. 15 in a collapsed state.

FIG. 17 illustrates how the first member 848a and second member 848b may be disengaged. Note that the second member 848b includes a groove 852 through which the first retaining pin 850 passes. When in a coupled state (illustrated in FIGS. 15 and 16), a first end 863 of the second member 848b is inserted in a receiving cavity or opening 865 defined by the first member 848a. Note that, when inserted, the pivot point of the second member 648b moves to a first end 865 of the groove 852. This causes the second member 648b to be automatically locked into the first member 848a. Because this pivot point is at the first end 867, it prevents the second member 848b from folding since (1) the first end 863 of the second member 848b is inserted within the cavity 865 of the first member 848a, and (2) the section of the second member 848b from the pivot point to the first end 863 is longer than the space needed to fold the second member 848b. Thus, even if the retaining collar 854 or second retaining pin 851 are removed, the second member 848b (and consequently the net frame member 844 coupled thereto) does not accidentally fold or injure a user or operator. Instead, to fold the second member 848b, the second member 848b is lifted so that the pivot point shifts from the first end 867 of the groove 852 to an opposite second end of the groove 852. By shifting the pivot point, the section of the second member 848b from the new pivot point to the first end 863 is shortened, allowing space needed to fold the second member 848b.

In one particular embodiment, the foldable trampoline net frame includes from six (6) to ten (10), preferably eight (8) net frame members 844 situated about the periphery of a trampoline frame 800. Each net frame member 844 may be situated within an inner circumference of the trampoline frame 800, or, alternatively within the outer circumference of the trampoline frame 800. In this particular embodiment, each net frame member 844 is pivotably connected within the inner circumference of the trampoline frame 800 by the mechanism described previously. Each net frame member 844 is adapted to collapse inward, or toward the center of an expanded trampoline surface (see FIG. 14B). Additionally, the offsetting feature of a frame assembly as explained with reference to FIG. 13 may prevent the net frame members from coming into contact with one another when the trampoline is folded (i.e., in a collapsed state).

Trampoline Kick Wheel

Figure 18A:
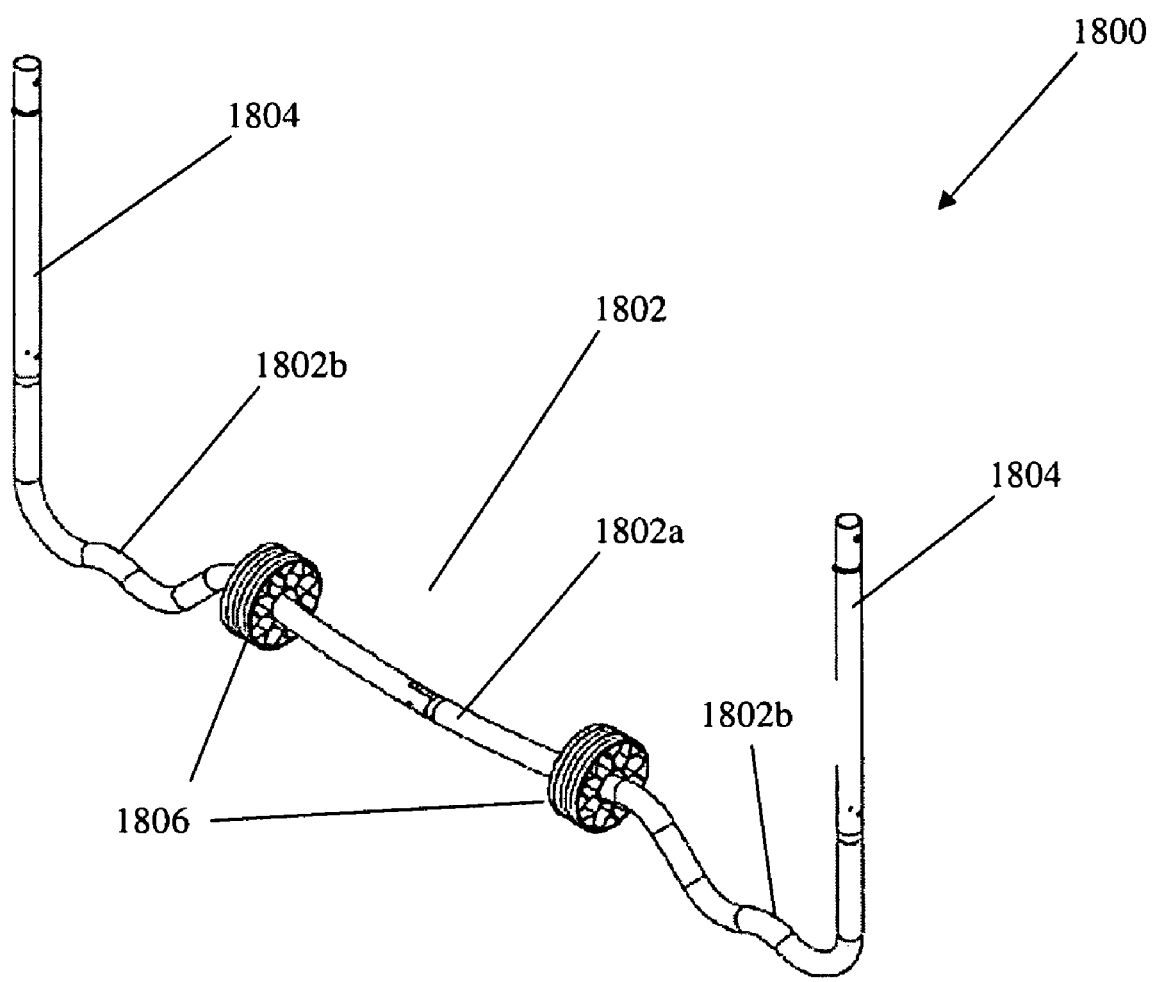
FIGS. 18A and 18B illustrate a wheeled support for a trampoline according to an embodiment of the invention.
Figure 18B:
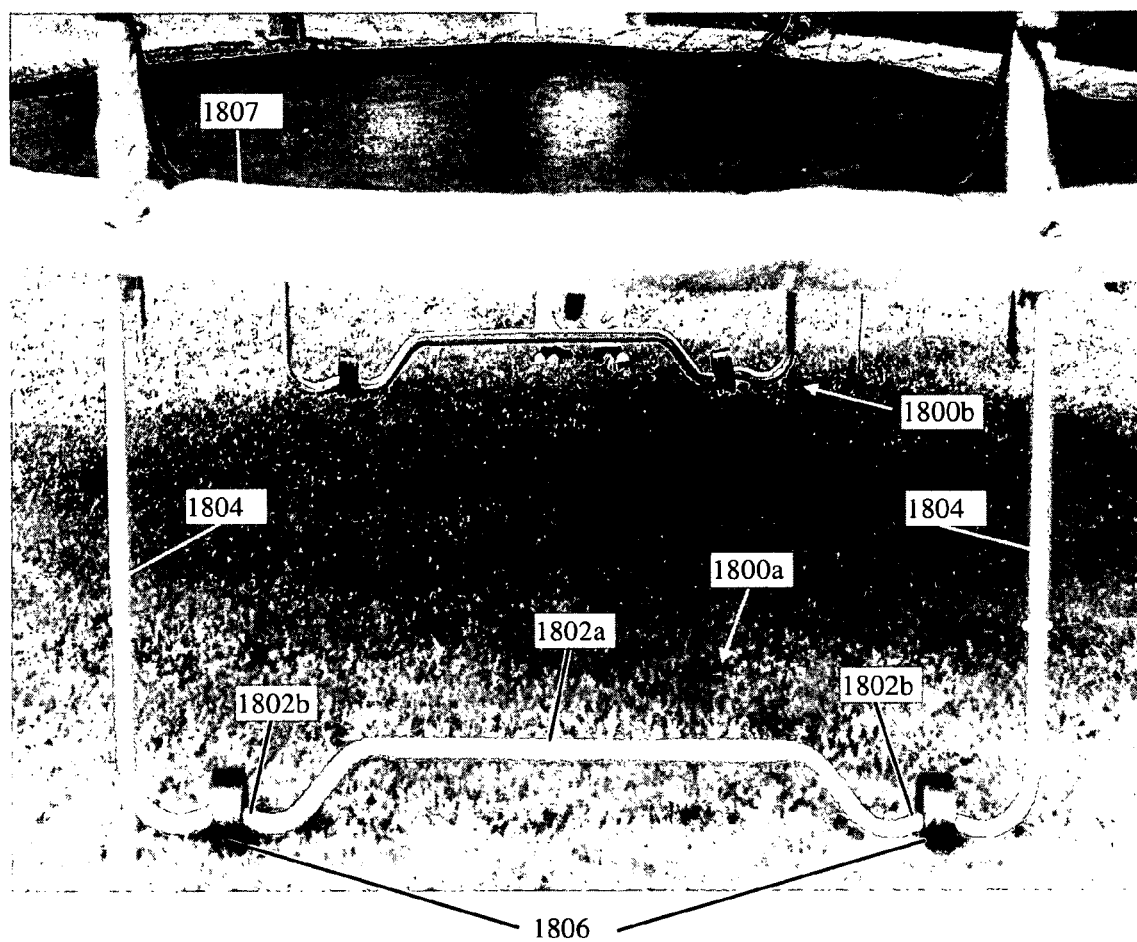

FIGS. 18A and 18B illustrate a wheeled support for a trampoline according to an embodiment of the invention. FIG. 18A illustrates the wheeled support 1800 having the kick wheels in a disengaged position. One or more wheeled supports 1800 may be disposed around the perimeter of a trampoline frame to provide support when the trampoline is in an expanded or unfolded position. The wheeled support 1800 may be approximately U-shaped with an approximately horizontal bar 1802 connected to at least two (2) vertical bars 1804 perpendicular to the approximately horizontal bar 1802. The bar 1802 may include medial portion 1802a and end portions 1802b adjacent both sides of the medial portion 1802a. The medial portion 1802a may be substantially or completely horizontal while the end portions 1802b may be approximately W-shaped and/or sinusoidal shaped. More particularly, the end portions 1802b may include a first valley portion, a crest portion, and a second valley portion wherein each extending leg of each W-shaped and/or sinusoidal shaped end portion 1802b connect to the medial portion 1802a and each vertical bar 1804, respectively.

Figure 19:
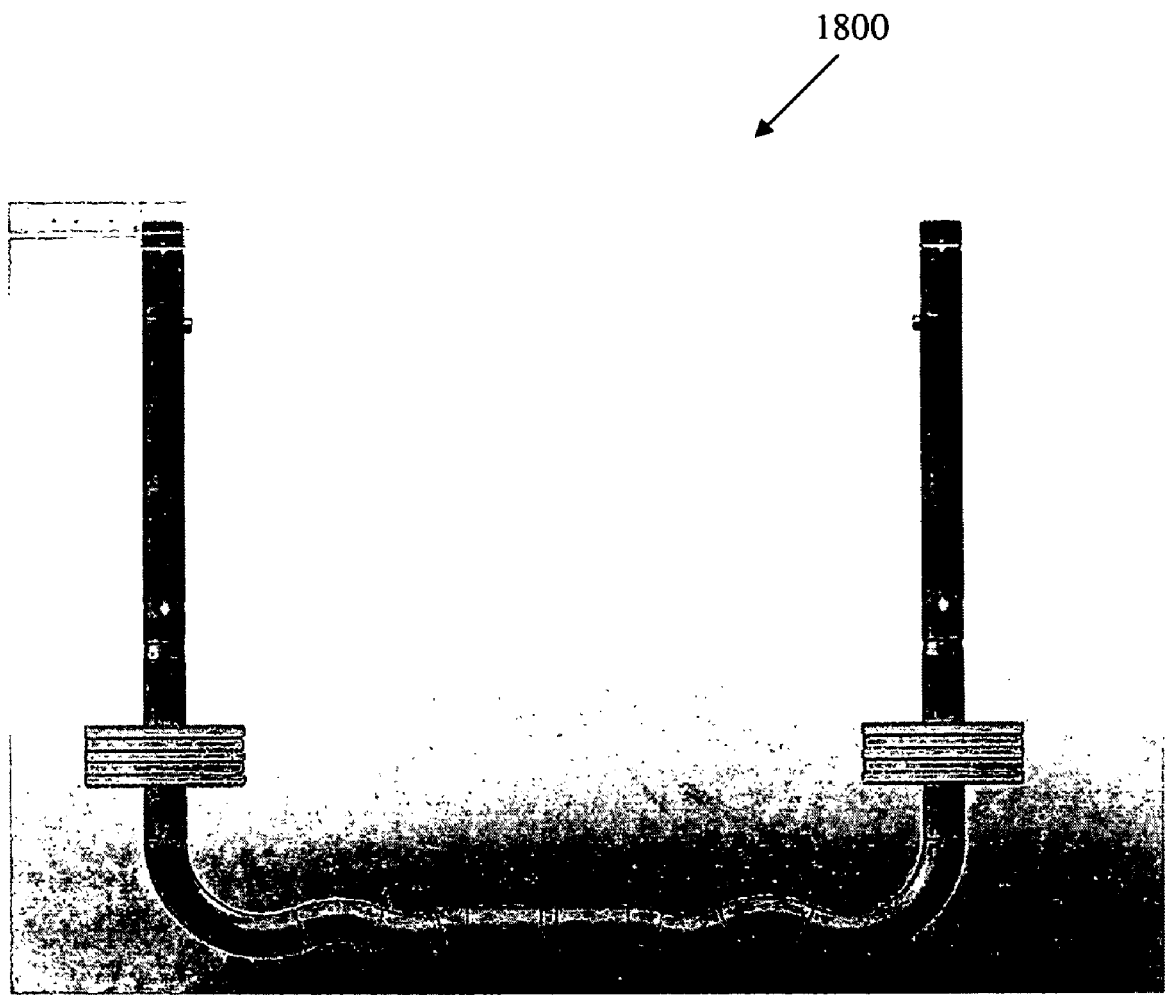
FIG. 19 is a front view of the wheeled support of FIG. 18

The wheeled support 1800 may be tubular and may comprise a plurality of pieces connected together. In some embodiments, the plurality of pieces may be friction-fitted and optionally locked together with a locking mechanism, such as a retaining pin/hole type locking mechanism. The wheeled support 1800 may be made of galvanized steel or any other like material; however, the wheeled support 1800 should be capable of withstanding a substantial amount of weight, e.g., between about three-hundred (300) pounds (about 136 kilograms) to about eight-hundred (800) pounds (about 362 kilograms). The wheeled support 1800 may be pivotably connected to a trampoline frame and configured to move from an extended position to a collapsed position relative to the trampoline frame. FIG. 19 is a front view of the wheeled support 1800 of FIG. 18.

Each end portion 1802b may be adapted to hold a wheel 1806 thereon. In one embodiment, the wheel may be adapted to move from a first position to a second position. In the first position, the wheel 1806 may approximately rest on the medial portion 1802a. In the second position, the wheel 1806 may approximately rest on the crest portion of the end portion 1802b. During operation, a user may wish to move each wheel 1806 from the first position (at medial portion 1802a) to the second position (at end portion 1802b) or vice-versa. For example, when the wheeled support 1800 is perpendicular to a surface of a trampoline (i.e., extended position) to support the trampoline, each wheel 1806 may be moved from the first position to the second position (e.g., on crest portion of each end portion 1802b) by a user when the user wishes to move the trampoline about a surface, i.e., grass, concrete, etc. Once moved, each wheel 1806 may be moved from the second position (at end portion 1802b) to the first position (e.g., on the medial portion 1802a) by a user when the user wishes the trampoline to remain immobile. However, the wheel 1806 may alternatively be left in the first position due to that the wheel 1806 is nonetheless "cradled" within the W-shaped and/or sinusoidal-shaped end portion 1802b. Also, in an alternative embodiment, each wheel 1806 may be moved from the second position (at end portion 1802b) onto a portion of the vertical bars 1804, respectively (see FIG. 19).

FIG. 18B illustrates the wheeled support 1800 having the kick wheels in an engaged position. This figure illustrates how a first and second wheeled supports 1800a and 1800b may be coupled to opposite sides of a trampoline frame 1807. The kick wheels 1806 are positioned at the end portions 1802b. The end portions 1802b include a crest portion in which the kick wheels 1806 are retained. In the engaged positions, the wheels 1806 allow the trampoline to be rolled.

In one illustrative example, a plurality of wheeled supports 1800 may be pivotably connected to a periphery of a trampoline. For example, a sixteen and one-half (16 and ½) foot (about 5.029 meters) trampoline in diameter may include four (4) wheeled supports 1800 pivotably connected and situated about the periphery thereof. When in storage or otherwise not in use, i.e., in the collapsed position, the wheeled supports 1800 may be situated substantially adjacent to a bottom surface of the trampoline, i.e., folded inward. When ready for use, the wheeled supports 1800 may be moved to the extended position by a user, i.e., folded outward. To position the trampoline about a surface, e.g., grass, an edge of the trampoline may be lifted and the wheels 1806 may be "kicked" from the first position to the second position by a user. After positioning thereof, the edge of the trampoline may be again lifted and the wheels 1806 may be "kicked" from the second position to the first position by the user. Advantageously, the wheels 1806 (in the first position) are now off of the grass and thereby avoid getting soiled and damaged from the grass.

FIG. 20A is a perspective view of a wheel according to an embodiment of the invention. The wheel 1806 may have a center aperture with a radius substantially the same as the radius of the wheeled support 1800. More particularly, the center aperture of the wheel 1806 may match the radius of the "bend" of the end portions 1802b. That is, the aperture may be substantially hour-glassed shaped when viewed cross-sectionally (see FIG. 20B). Advantageously, this configuration allows the wheel 1806 to slide or roll along the wheeled support 1800 easier relative to prior art configurations. One of ordinary skill in the art will appreciate that the wheeled support 1800 functions as an axle relative to the wheel 1806 allowing for rotation thereof. FIG. 20C is front view of the wheel 1806 of FIG. 20A. FIG. 20D is a cross-sectional view of the wheel 1806 of FIG. 20C taken lines A-A.

Folding Trampoline Ladder

Figure 21:
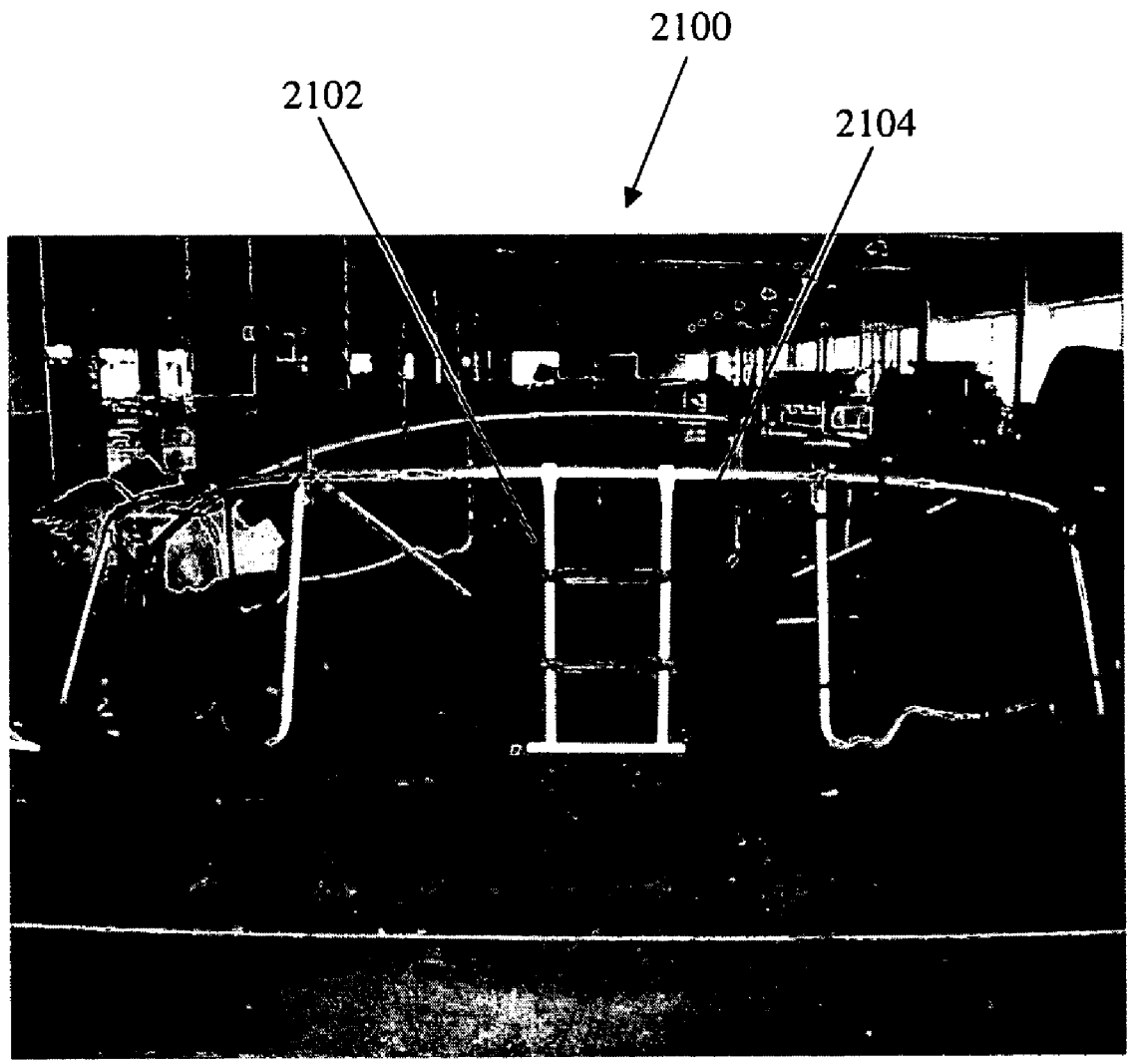
FIG. 21 is a front view of foldable trampoline ladder which may be attached to a trampoline (shown in an expanded state) according to an embodiment of the invention.

FIG. 21 is a front view of a foldable trampoline ladder which may be attached to a trampoline (shown in an expanded state) according to embodiments of the invention. In one embodiment, a folding trampoline assembly 2100 is provided in which a foldable trampoline ladder 2102 is rotatably coupled to a frame 2104. The trampoline ladder 2102 includes a horizontally-positioned base bar and at least two vertical support bars connected thereto. In one example, the horizontally-positioned base bar and the two vertical support bars may be made of galvanized steel, aluminum, or other suitable material and coated with a polymer-based material. In some embodiments, both the horizontally-positioned base bar and the two vertical support bars are tubular; however, other geometric configurations are within the scope of the invention. In an embodiment in which the bars are tubular, a diameter of the horizontally-positioned base bar and the two vertical support bars may be between one-half (½) inch (15.24 centimeters) and two (2) inches (60.96 centimeters).

A plurality of rungs may be positioned between the vertical support bars of the ladder 2102, e.g., two rungs for a thirty-three (33) inch (1005.34 centimeters) to thirty-seven (37) inch (1127.76 centimeters) tall trampoline and three rungs for a thirty-seven (37) inch (1127.76 centimeters) to a forty-one (41) inch (1249.68 centimeters) trampoline. Also, a rung may include an aperture on both ends of the rung wherein the aperture is adapted to receive a vertical support bar. In some embodiments, the rung may be slidably positioned along the length of the vertical support bar. Also, the horizontally-positioned base bar may be longer in length relative to the plurality of rungs.

Figure 22:
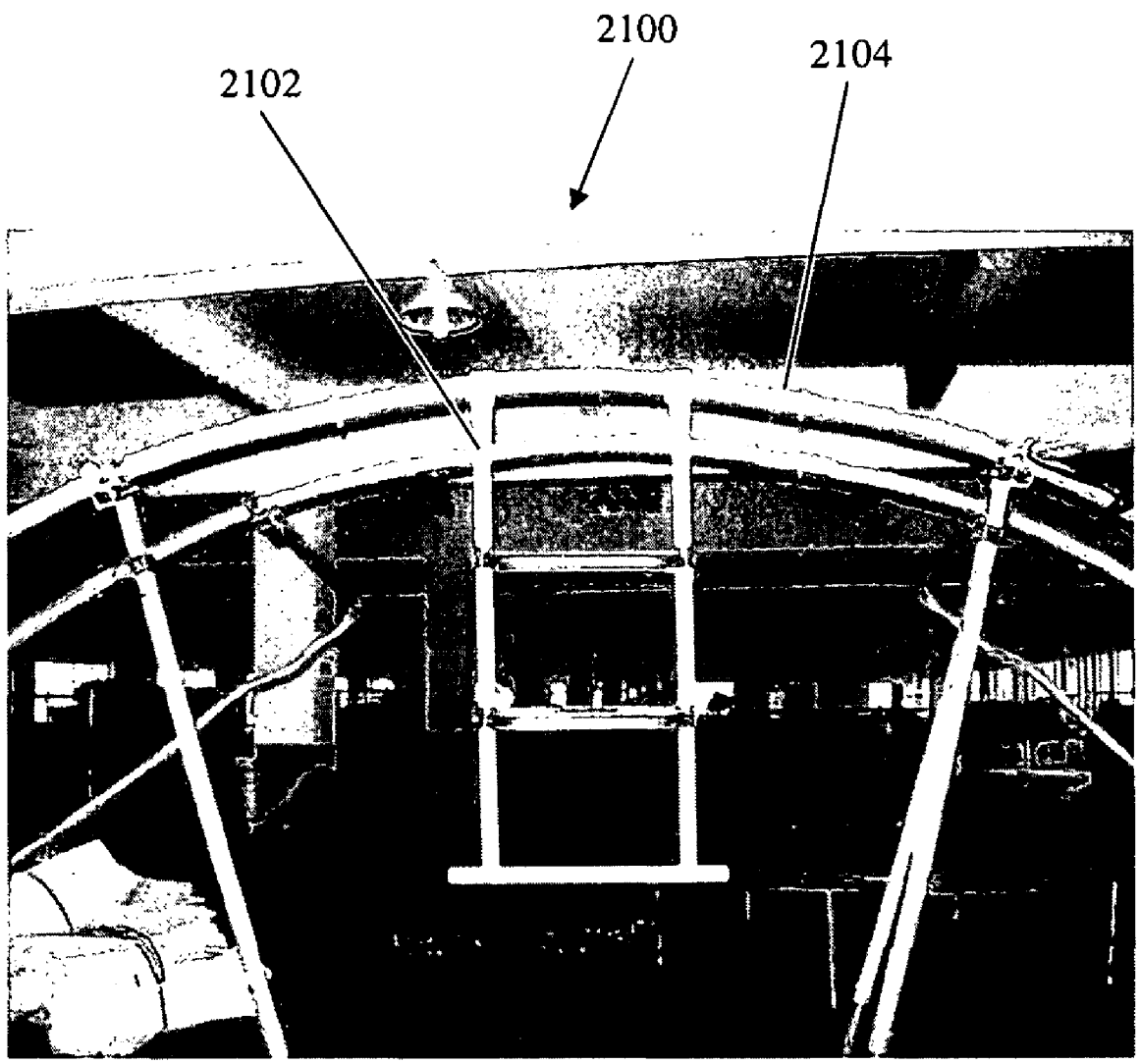
FIG. 22 is a front view of the foldable trampoline ladder shown in FIG. 21 (shown in a collapsed state).

The vertical bars of the ladder 2102 may be connected to the horizontally-based bar at a proximal end by welding or like fastening means while simultaneously connected to a trampoline frame 2104 at a distal end by connecting means. The connecting means that attach the ladder 2102 to the frame 2104 may allow the ladder 2102 to partially or completely rotate about the frame 2104. In an exemplary configuration, the connecting means may be a cylindrical-like configuration with an aperture for receiving and/or encircling the annular, tubular trampoline frame 2104, i.e., a male/female-type configuration. The cylindrical-like configuration may be welded and integral with the distal end of the vertical bar of the ladder 2102. Also, a diameter of the aperture, i.e., circular aperture, may be greater than the diameter of a cross-section of the annular trampoline frame 2104. In this manner, the cylindrical-like configuration may be rotatable about the annular trampoline frame. For example, for storage purposes, a user may fold the foldable trampoline ladder 2102 inward within the trampoline assembly 2100. FIG. 22 is a front view of the foldable trampoline ladder shown in FIG. 21 (shown in a collapsed state).

In another embodiment, the foldable trampoline ladder 2102 may function as a supporting leg section of the trampoline frame 2104 or assembly 2100 itself. For example, with respect to an annular trampoline frame 2104, at least two foldable trampoline ladders 2102 may be positioned approximately one-hundred and eighty (180) degrees from one another. The foldable trampoline ladders 2102 may have similar or the same characteristics as described previously, i.e., they may be rotatable about the annular trampoline frame 2104 and foldable within the assembly 2100. In one embodiment, each ladder 2102 may be angled relative to a vertical line, i.e., angled relative to a line perpendicular to the horizontal plane in which the trampoline surface resides. For example, when the trampoline assembly 2100 is open and positioned for use, the ladder 2102 may angle between six (6) degrees and fifteen (15), preferably ten (10) degrees. In this manner, each foldable trampoline ladders 2102 provides a safer mount to the trampoline surface relative to a conventional trampoline ladder positioned perpendicular with respect to the horizontal plane in which the trampoline surface resides.

Convex Trampoline Edge Padding

According to embodiments of the invention, a frame pad including a suitable flexible, weather-resistant material such as vinyl plastic or equivalent may be situated about the periphery of a trampoline such as the trampoline and component parts described above. The frame pad may be unitary or comprise a plurality of segments interconnected thereto. The frame pad may incorporate a layer of open-cell or closed-cell foam along an underside of the frame pad to protect a trampoline user from harm. In many conventional safety padding configurations, a concave shape tends to form along the middle of the frame pad, leading to unwanted water collection when rain falls. To address this issue, the frame pad may have a convex shape or profile.

Figure 23:
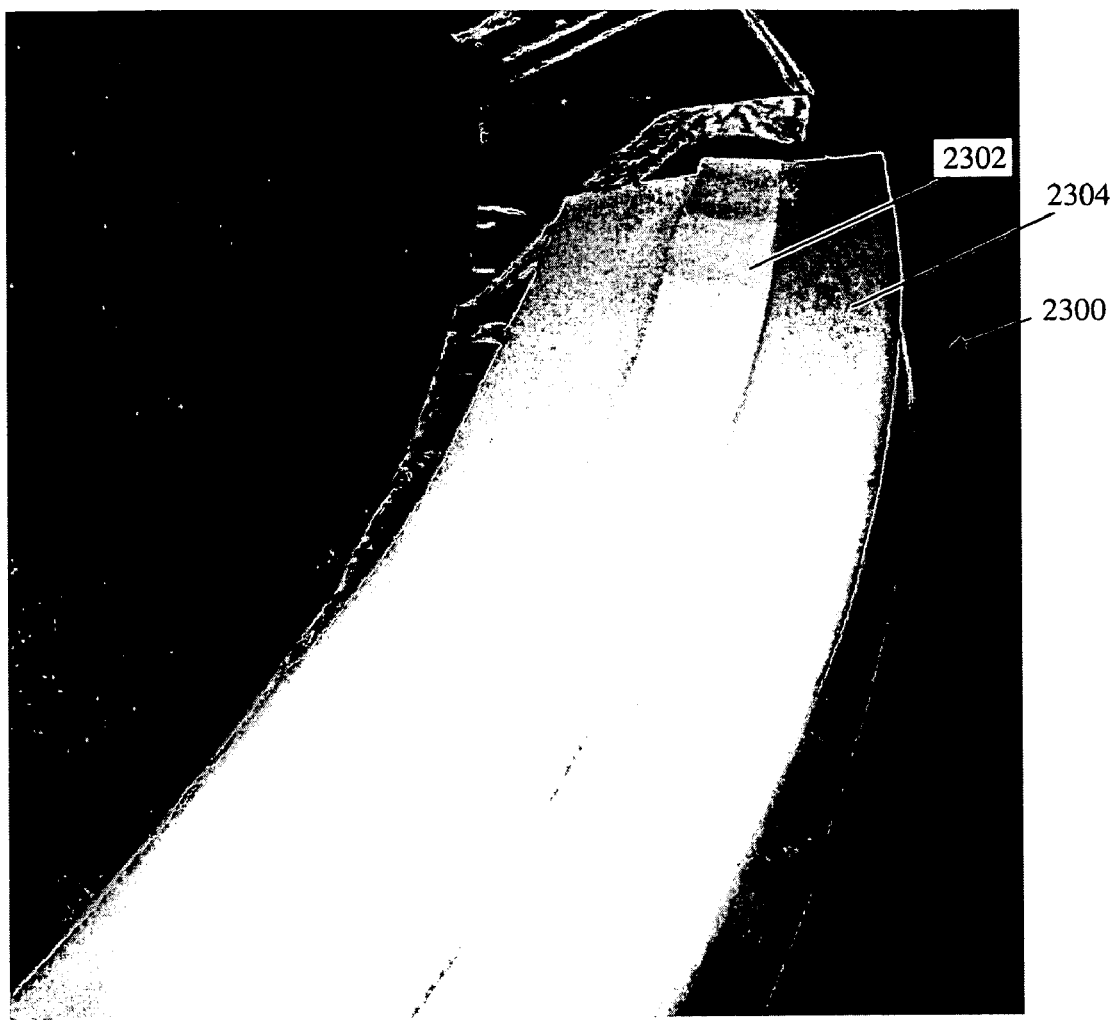
FIG. 23 illustrates a view of a frame pad having a convex shape according to one example.

FIG. 23 illustrates a view of a frame pad having a convex shape according to one example. Along the median of the frame pad 2300, an additional layer 2302 of open-celled or closed-cell foam may be included on top of a base pad 2304. When covered, the additional layer 2302 along the middle of the frame pad 2300 forms a convex shape that allows water to run off the frame pad 2300.

In one embodiment, the frame pad 2300 is annular and adapted to cover a periphery of a circular-shaped trampoline; however, other geometric configurations are within the scope of the invention. The frame pad 2300 may include an inner edge and an outer edge wherein the inner edge is adapted to rest on, or attach to, a surface of a trampoline and the outer edge is adapted to cover a peripheral frame of the trampoline, e.g., a tubular peripheral frame of the trampoline. In that respect, the outer edge may comprise a retaining lip adapted to grip a trampoline frame, e.g., a tubular, annular galvanized steel frame. The retaining lip should be sufficiently flexible to be stretched over the trampoline frame but remain snugly fit about the frame when stretched thereon. The outer edge may additionally include a bead sewn to the outer edge.

Figure 24:
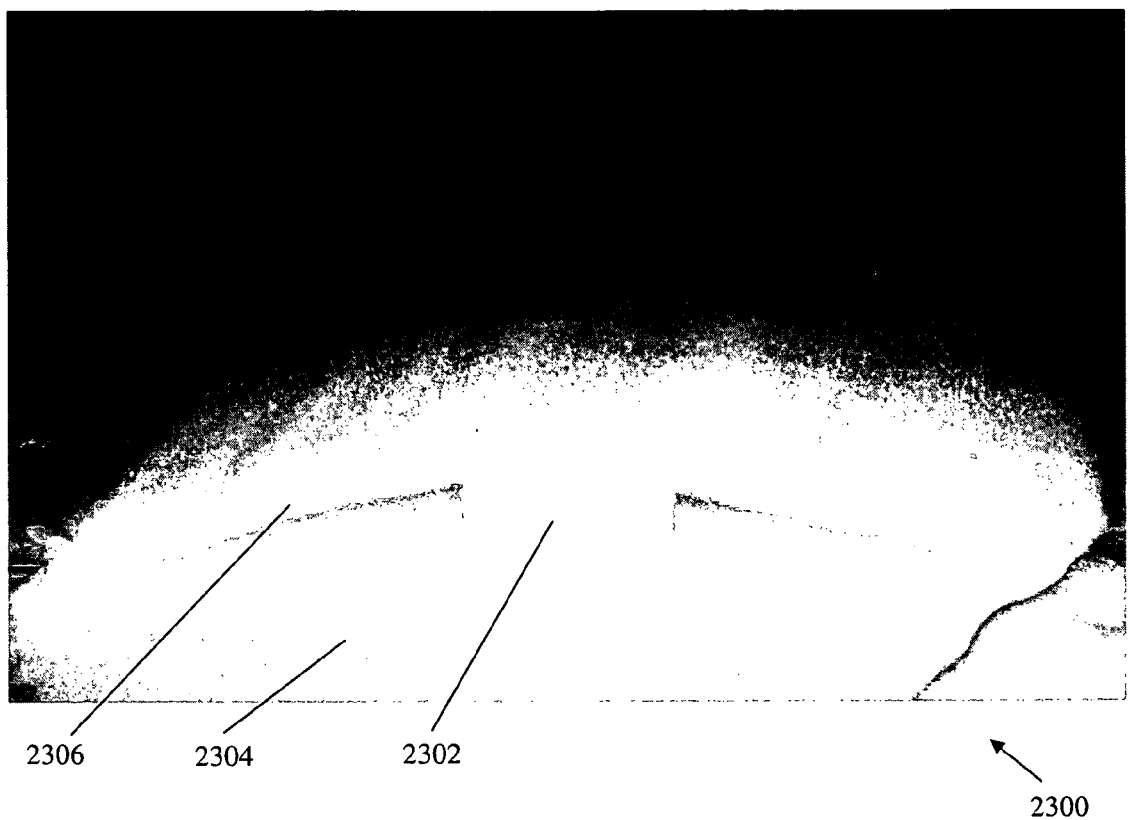
FIG. 24 illustrates a cross-section of a frame pad according to one example.

FIG. 24 illustrates a cross-section of a frame pad according to one example. The frame pad 2300 may include at least two layers, i.e., a top layer 2306 and a bottom layer 2304. The top layer 2306 may comprise a suitable flexible, weather-resistant (e.g., water-resistant, UV-resistant) material such as vinyl plastic, e.g., polyvinyl chloride, while the bottom layer 2304 may comprise open-cell or closed-cell foam. In one embodiment, the foam is cross-linked polyethylene or equivalent and about one (1) inch (30.48 centimeters) in thickness. The top layer 2306 and the bottom layer 2604 may be substantially the same size in width, i.e., for both layers, between about ten (10) inches (304.8 centimeters) and about sixteen (16) inches (487.68 centimeters).

Situated between the top and bottom layers 2306 and 2304 may be a third layer 2302 which may also comprise open-cell or closed-cell foam. Similar to the bottom layer 2304, the foam is cross-linked polyethylene or equivalent and about one (1) inch (30.48 centimeters) to about three (3) inches (91.44 centimeters) in thickness. In contrast to the widths of the top and bottom layers, the third layer 2302 may have a substantially smaller width, i.e., between about two (2) inches (60.96 centimeters) to about six (6) inches (182.88 centimeters) and be situated within a median of the bottom layer 2304. The third layer 2306 creates a "crest" or convex profile about the median of the frame pad 2300 such that water or debris is inclined to roll off of the crest thereby preventing an accumulation of water and/or debris which may otherwise compromise the integrity of the frame pad.

Figure 25:
FIG. 25 illustrates a frame pad with a convex top as installed along the edge of a trampoline.

FIG. 25 illustrates a frame pad 2300 with a convex top as installed along the edge of a trampoline.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:

1. A trampoline, comprising:
    a first frame assembly, the first frame assembly including
        a base frame member;
        a first connecting member pivotably connected approximately at a first end of the base frame member and a second connecting member pivotably connected approximately at a second end of the base frame member;
        a center post positioned between the first connecting member and the second connecting member and coupled to the base frame member at a first end;
        a center bracket slidably engaged to the center post;
        a first peripheral frame member pivotably connected to the first connecting member and a second peripheral frame member pivotably connected to the second connecting member wherein both first and second connecting frame members are connected to the center bracket;
        a supporting bracket coupled to a second end of the center post, the supporting bracket having a horizontally-oriented protrusion projecting inwardly relative to the trampoline and an opening;
        a crank shaft rotationally coupled to the second end of the center post, the crank shaft having a first gear portion;
        an elongated threaded member passing through the opening of the support bracket and rotatably coupled to the center bracket while extending along the center post, the elongated threaded member having a second gear portion in rotational connection with the first gear portion, wherein upon rotational force being applied to the elongated member via the crank shaft, the elongated threaded member rotates to cause the first and second peripheral frame members to collapse into one another or expand away from one another;
    at least two arcuate frame members connected to the first and second peripheral frame members and defining a circle in an expanded state; and
    a resilient web attached to the frame assembly by a plurality of springs.

2. The trampoline of claim 1 wherein the center bracket includes a retaining block fixedly attached thereto, the retaining block having a threaded aperture through which the elongated threaded member passes.

3. The trampoline of claim 1 wherein the first and second gear portions are situated approximately ninety degrees relative to one another.

4. The trampoline of claim 1 wherein a length of the elongated threaded member is substantially the same as a length of the center post.

5. The trampoline of claim 1 wherein upon rotational force being applied to the elongated member in a first direction, the first and second peripheral members are collapsed into one another and the center bracket is substantially adjacent to the base frame member.

6. The trampoline of claim 1, further comprising: a set of wheels attached to the base frame member.

7. The trampoline of claim 1, further comprising: at least two hydraulic pistons connected to the base frame member and pivotably connected to the center bracket.

8. The trampoline of claim 1 wherein the first peripheral frame member is off-set relative to the second peripheral frame member.

9. The trampoline of claim 1, further comprising:
    a plurality of frame members pivotably connected about a periphery of the trampoline frame assembly, the frame members adapted to position between an expanded state and a collapsed state; and
    a plurality of pivot joints connecting the plurality of frame members to an inner circumference of the trampoline frame assembly wherein the pivot joints comprise a first member and a second member pivotably connected by a retaining pin, the first member and the second member defining an aperture at the point of connection thereto.

10. The trampoline of claim 9 wherein the expanded state is when the plurality of frame members is in a vertical position relative to a horizontal surface.

11. The trampoline of claim 9 wherein the collapsed state is when the plurality of frame members is in a horizontal position relative to a horizontal surface.

12. The trampoline of claim 9 wherein the plurality of frame members are adapted to collapse inward toward a middle of the trampoline frame assembly.

13. The trampoline of claim 1, further comprising:

a second frame assembly coupled to the at least two arcuate frame members, the second frame assembly located opposite the first frame assembly and including a short threaded member shorter than the elongated threaded member.

14. The trampoline of claim 1, further comprising:

a U-shaped support pivotably connected to a periphery of a trampoline and adapted to position from a collapsed state to an extended state, the support including a substantially horizontal bar and at least two vertical bars attached thereto, the substantially horizontal bar including a medial portion and at least two end portion on opposite ends of the medial portion, each end portion having a W-shaped configuration; and at least two wheels on the support and adapted to position from a first position to a second position wherein the first position is on the medial portion and the second position is on a crest of the W-shaped configuration.

15. The trampoline of claim 1, further comprising:

a frame pad for a trampoline, the frame pad comprising: (i) a top layer comprising a flexible, weather-resistant material; (ii) a bottom layer comprising a foam material; and (iii) a middle layer comprising a foam material situated between the top layer and the bottom layer wherein the top layer and the bottom layer have a substantially similar width and the middle layer has a width substantially smaller relative to the top and bottom layers thereby defining a convex profile.

16. The trampoline of claim 1, further comprising:

a foldable trampoline ladder, the foldable trampoline ladder comprising: (i) a horizontally-positioned bar; (ii) at least two vertical bars fixedly attached to the horizontally-positioned bar, the at least two vertical bars each having a proximal end and a distal end, the at least two vertical bars attached to the horizontally-positioned bar at each proximal end; (iii) at least two cylindrical-like fixtures coupled to each distal end of the at least two vertical bars wherein the cylindrical-like fixtures are adapted to receive a trampoline frame; and (iv) a plurality of rungs situated between the at least two vertical bars, wherein the at least two cylindrical-like fixtures permit the trampoline ladder to rotate when the trampoline is folded or unfolded.

17. A trampoline conversion kit having a plurality of component parts, the kit at least capable of converting a non-foldable trampoline to a foldable trampoline, the kit comprising:

a base frame member;

a first connecting member pivotably connected approximately at a first end of the base frame member and a second connecting member pivotably connected approximately at a second end of the base frame member;

a center post positioned between the first connecting member and the second connecting member and coupled to the base frame member at a first end;

a center bracket slidably engaged to the center post;

a first peripheral frame member pivotably connected to the first connecting member and a second peripheral frame member pivotably connected to the second connecting member wherein both first and second connecting frame members are connected to the center bracket;

a supporting bracket coupled to a second end of the center post, the supporting bracket having a horizontally-oriented protrusion projecting inwardly relative to the trampoline and an opening;

a crank shaft rotationally coupled to the second end of the center post, the crank shaft having a first gear portion; and an elongated threaded member passing through the opening of the support bracket and rotatably coupled to the center bracket while extending along the center post, the elongated threaded member having a second gear portion in rotational connection with the first gear portion, wherein upon rotational force being applied to the elongated member via the crank shaft, the elongated threaded member rotates to cause the first and second peripheral frame members to collapse into one another or expand away from one another.

18. The trampoline conversion kit of claim 17 wherein the first and second gear portions are situated approximately ninety degrees relative to one another.

19. The trampoline conversion kit of claim 17 wherein the center bracket includes a retaining block fixedly attached thereto, the retaining block having a threaded aperture through which the elongated threaded member passes.

20. The trampoline conversion kit of claim 17 wherein the elongated threaded member is sized such that a tip portion remains within the retaining protrusion when the conversion kit is in a collapsed state and the center bracket is detached from the elongated threaded member.

* * * * *